US010783396B2

(12) United States Patent
Biswas et al.

(10) Patent No.: US 10,783,396 B2
(45) Date of Patent: Sep. 22, 2020

(54) IDENTIFYING AND MANIPULATING MATCHING SHAPES ACROSS DIGITAL IMAGES

(71) Applicant: Adobe Inc., San Jose, CA (US)

(72) Inventors: Sanjeev Kumar Biswas, Bangalore (IN); Praveen Kumar Dhanuka, Noida (IN)

(73) Assignee: ADOBE INC., San Jose, CA (US)

( * ) Notice: Subject to any disclaimer, the term of this patent is extended or adjusted under 35 U.S.C. 154(b) by 221 days.

(21) Appl. No.: 15/981,051

(22) Filed: May 16, 2018

(65) Prior Publication Data

US 2019/0354793 A1 Nov. 21, 2019

(51) Int. Cl.
| | |
|---|---|
| *G06K 9/00* | (2006.01) |
| *G06K 9/46* | (2006.01) |
| *G06T 7/593* | (2017.01) |
| *H04N 1/60* | (2006.01) |
| *G06T 9/00* | (2006.01) |
| *G06T 7/00* | (2017.01) |

(52) U.S. Cl.
CPC ............ *G06K 9/4609* (2013.01); *G06T 7/593* (2017.01); *G06T 7/97* (2017.01); *G06T 9/00* (2013.01); *H04N 1/60* (2013.01)

(58) Field of Classification Search
CPC ......... G06K 9/4609; G06T 7/97; G06T 7/593; G06T 9/00; H04N 1/60
See application file for complete search history.

(56) References Cited

U.S. PATENT DOCUMENTS

| | | | | |
|---|---|---|---|---|
| 6,775,678 | B1 * | 8/2004 | Hillberg | G06F 40/169 |
| 7,331,052 | B2 * | 2/2008 | Ferlitsch | G06F 3/1205 |
| | | | | 358/1.18 |
| 7,458,022 | B2 * | 11/2008 | Ramarao | G06F 40/154 |
| | | | | 715/236 |
| 7,750,924 | B2 * | 7/2010 | Berker | G06F 40/103 |
| | | | | 345/619 |

(Continued)

OTHER PUBLICATIONS

S. Belongie, J. Malik and J. Puzicha, "Shape matching and object recognition using shape contexts," in IEEE Transactions on Pattern Analysis and Machine Intelligence, vol. 24, No. 4, pp. 509-522, Apr. 2002. doi: 10.1109/34.993558.

(Continued)

*Primary Examiner* — Gregory M Desire
(74) *Attorney, Agent, or Firm* — Keller Jolley Preece

(57) ABSTRACT

The present disclosure includes systems, methods, and non-transitory computer readable media that efficiently and accurately identify matching designs and sub-shapes across one or more digital canvases in order to provide one or more development tools for rapid and efficient editing of the digital canvases. In particular, one or more embodiments utilize a transformation-agnostic method of identifying matching designs and sub-shapes between multiple digital canvases. Furthermore, in response to identifying a set of matching designs or sub-shapes, one or more embodiments generate a mapping between the matching designs or sub-shapes. Utilizing this mapping, one or more embodiments provide various tools that enable rapid and efficient development of robust digital canvases, while minimizing system storage burdens.

20 Claims, 20 Drawing Sheets

(56) References Cited

U.S. PATENT DOCUMENTS 8,990,672 B1 * 3/2015 Grosz .................. G06F 40/186
715/202

OTHER PUBLICATIONS

M. Aubry, U. Schlickewei and D. Cremers, "The wave kernel signature: A quantum mechanical approach to shape analysis," 2011 IEEE International Conference on Computer Vision Workshops (ICCV Workshops), Barcelona, 2011, pp. 1626-1633. doi: 10.1109/ICCVW.2011.6130444.

* cited by examiner

IDENTIFYING AND MANIPULATING MATCHING SHAPES ACROSS DIGITAL IMAGES

BACKGROUND

Developers have achieved significant improvements in digital canvas editing systems that enable development of robust and beautiful digital canvases. For example, conventional digital canvas editing systems enable users to cut and paste a shape or collection of shapes across multiple images in order to rapidly create a series of related digital canvases. Utilizing conventional digital canvas editing systems, digital designers can quickly create comic strip-style art with multiple panels or images that each include similar designs—such as a specific character shown in different poses (e.g., a man shown walking), or a shape in different sizes (e.g., clouds in the sky).

Although conventional digital canvas editing systems provide various tools for rapid digital canvas creation and editing, these systems have a number of shortcomings. For example, conventional systems provide inefficient tools for editing collections of digital canvases. Because computing devices can only display a limited amount of information via a display screen, conventional systems typically divide data and functionality into many layers, menus, or views in different user interfaces. To illustrate, in order to enact an edit across multiple copies of a digital canvas, conventional systems generally require a user to scroll through a workspace of images, switch views, select menus and tools, rearrange displays, and so forth. This makes the creative process slow, complex and difficult to learn—particularly for inexperienced users.

Additionally, conventional systems create inaccuracies when edits are made to one of multiple similar designs. For instance, a user may edit a design in one panel when working on a comic strip-style document including multiple panels that each include additional instances of the same design. To illustrate, if each panel includes a representation of a tree, the user may only change the color of the tree foliage in the first panel. Conventional systems then inaccurately portray the related shapes in the other panels without the detected edit to the first panel.

Moreover, conventional systems lack flexibility. For example, in response to the scenario just described, conventional systems offer no remedy save requiring the user to manually enact the same edit to each panel in the comic strip-style document that includes the edited design. For instance, in the example above, conventional systems require the user to manually change the tree foliage color in each additional instance of the representation of the tree. This inflexibility wastes user time and adds an unnecessary level of hassle to the user's creative process.

Furthermore, conventional systems introduce system-level inefficiencies. For example, a user may create a document that includes multiple images (e.g., as with a comic strip), where each image includes a copy of the same design or group of shapes. Conventional systems will inefficiently store each copy of the design or group of shapes separately within system memory. It follows that conventional systems require a large amount of memory to store the document, even though the document includes multiple copies of the same design or group of shapes.

BRIEF SUMMARY

One or more embodiments of the present disclosure provide benefits and/or solve one or more of the foregoing or other problems in the art with systems, methods, and non-transitory computer readable storage media that efficiently and accurately identify matching designs and sub-shapes across one or more digital canvases in order to provide one or more tools for rapid and efficient editing of the digital canvases. Specifically, in one or more embodiments, the disclosed systems utilize a transformation-agnostic method of identifying matching designs and sub-shapes between multiple digital canvases. Moreover, in response to identifying a set of matching designs or sub-shapes, the disclosed systems generate a mapping between the matching designs or sub-shapes. Utilizing this mapping, the disclosed systems can provide various tools that enable rapid and efficient manipulation of robust digital canvases, while minimizing system storage burdens.

Additional features and advantages of one or more embodiments of the present disclosure will be set forth in the description that follows, and in part will be obvious from the description, or may be learned by practice of such example embodiments.

BRIEF DESCRIPTION OF THE DRAWINGS

The detailed description is described with reference to the accompanying drawings in which.

DETAILED DESCRIPTION

Figure 1A:
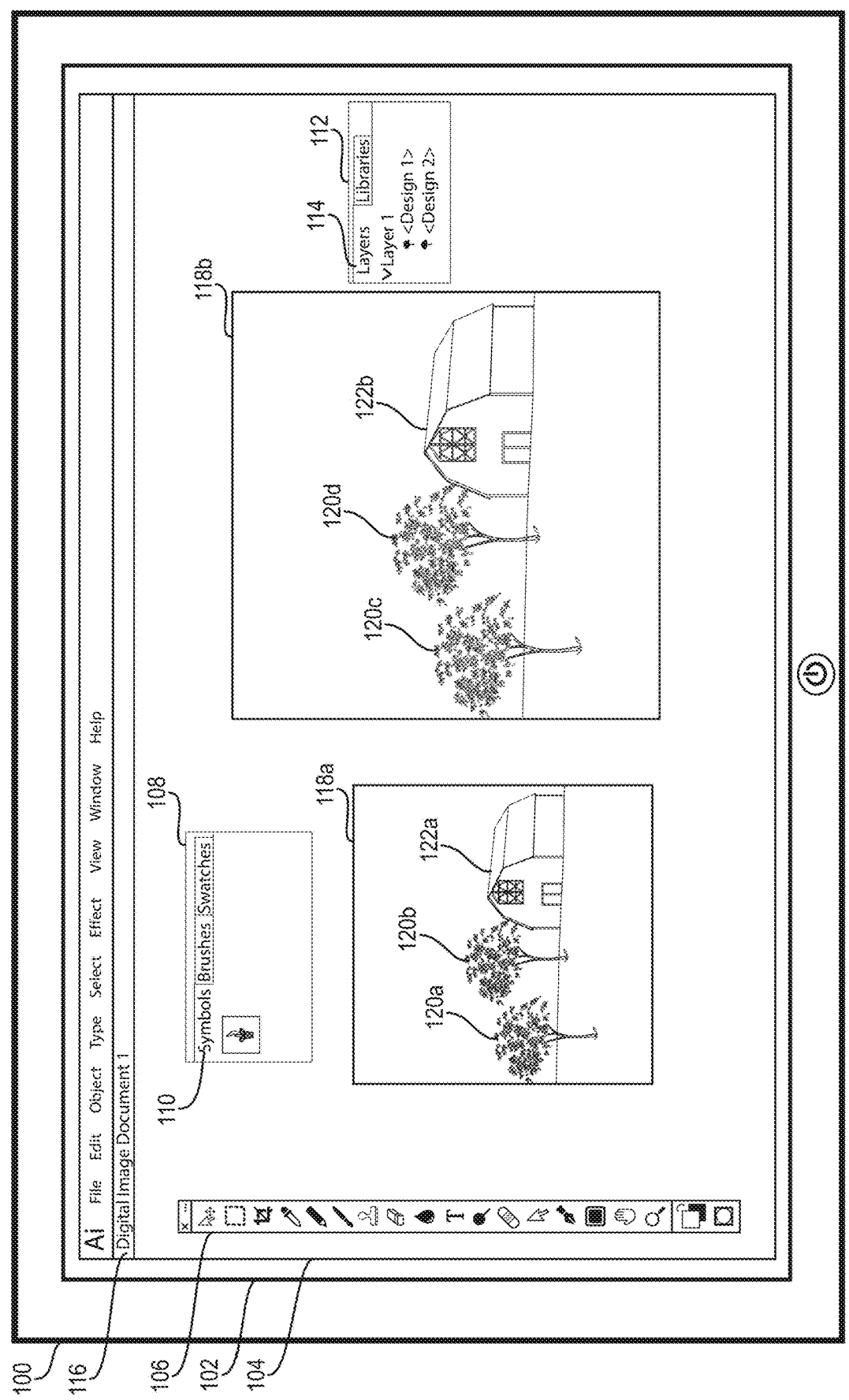
FIGS. 1A-1E illustrate example graphical user interfaces illustrating manipulation of designs in accordance with one or more embodiments.

One or more embodiments of the present disclosure include a digital media management system that efficiently and accurately identifies matching designs and sub-shapes across one or more digital canvases in order to provide one or more tools for rapid editing of the digital canvases. For example, in one embodiment, the digital media management system identifies matching designs within one or more digital canvases, and replaces the matching designs with a dynamic symbol. Following this replacement, the digital media management system propagates any changes made to the dynamic symbol to the various instances of the dynamic symbol within the one or more digital canvases. Thus, the digital media management system reduces user edit time as well as system storage requirements by replacing multiple designs in the document with instances of a single dynamic symbol.

Additionally, in a second embodiment, the digital media management system identifies and maps corresponding sub-shapes between two or more instances of a design. Matching of sub-shapes, allows the digital media management system to automatically reflect changes to a sub-shape of a first instance of a design to a corresponding sub-shape in a second instance of the design. Furthermore, the digital media management system is intelligent enough to match sub-shapes across corresponding designs despite the designs having different configurations. For example, when a sub-shape has been edited or warped (e.g., as with a comic-style character shown in a different position of movement), the digital media management system utilizes a deformation-agnostic matching method to determine that matching sub-shapes. After matching two sub-shapes, the digital media management system maps the sub-shapes to each other such that any edit detected to one instance of the sub-shape is automatically applied to the other instances of the sub-shape. Utilizing the deformation-agnostic matching method, the digital media management system quickly and efficiently ensures that matching designs and sub-shapes across a document reflect the same edits and changes.

As mentioned above, the digital media management system identifies matching designs and sub-shapes across digital canvases within a document. The digital media management system can determine whether designs or sub-shapes matched based on comparing centroid distance ratios. For example, the digital media management system can determine centroid distance ratios for each design in a document. The digital media management system can that designs with centroid distance ratios within a predetermined tolerance level are matches.

In response to identifying two matching designs, the digital media management system can map the matching designs together. For example, in one or more embodiments, the digital media management system determines that the design with an earlier creation timestamp is the base design, and maps the remaining design to the base design. In at least one embodiment, the digital media management system can map a first design to a second design by adding a reference (e.g., a pointer) to the second design within metadata associated with the first design.

The digital media management system engages in a similar process to match and map sub-shapes together within the digital canvas data structure. In particular, the digital media management system can determine the centroid distance ratios for the sub-shapes in a first instance of a design. The digital media management system the determines the centroid distance ratio for the sub-shapes in a second instance of the design. The digital media management system can then determine that the sub-shapes of the different instances of the design with the closest centroid distance ratios are matches. Additionally, the digital media management system can iterate through all designs and sub-shapes in a document in a similar manner to identify matching designs and sub-shapes and then map them to each other.

After matching and mapping clusters of designs and sub-shapes, the digital media management system enables correlated manipulation of the designs and sub-shapes. For example, in the first embodiment described above, the digital media management system generates a dynamic symbol associated with the base design, and replaces the base design and all additional designs mapped to the base design with the dynamic symbol. In the second embodiment described above, the digital media management system detects modifications to one or more sub-shapes in the base design and automatically applies the detected modifications to the corresponding one or more sub-shapes in the additional designs mapped to the base design. The digital media management system can automatically apply these detected modifications even when the corresponding one or more sub-shapes have undergone significant warping or deformation.

As mentioned, the digital media management system provides a number of advantages over conventional systems. For example, the digital media management system optimizes available display space in association with documents that include large numbers of digital canvases. In one or more embodiments, the digital media management system enables the automatic matching, mapping, and modification of designs and sub-shapes across the digital canvases in a document thereby avoiding the need to scroll through workspaces, rearrange digital canvases, or select multiple menus or tools.

Additionally, the digital media management system improves accuracy and flexibility. For example, by automatically, and without human interaction, applying edits and other replacements to matching designs and sub-shapes, the digital media management system improves accuracy in a document that may include many copies of the same design. This mapping-based method is also flexible in that it matches designs and sub-shapes despite any transformations or deformations that may exist.

Moreover, the digital media management system improves the efficiency of a computing device on which it operates. For example, by automatically mapping matched designs and sub-shapes within a digital canvas data structure, the digital media management system greatly reduces the amount of storage required to save a document including a large number of digital canvases, designs, and sub-shapes. Furthermore, by automatically mapping matched designs and sub-shapes within the digital canvas data structure, the digital media management system reduces the amount of time required for a computing system to apply edits to multiple copies of a design or sub-shapes within a document.

As illustrated by the foregoing discussion, the present disclosure utilizes a variety of terms to describe features and advantages of the digital media management system. Additional detail is now provided regarding the meaning of such terms.

As used herein, a "document" or simply "document" refers to a digital canvas project file. In one or more embodiments, a document includes one or more digital canvases and is readable by an editing application associated with the digital media management system. For example, in response to a detected selection of a document file from a list of document files, the digital media management system can generate a display of the one or more digital canvases contained with the document. A user can edit and update a document using tools and other functions provided by the digital media management system via the editing application.

As used herein, a "digital canvas" refers to single palette or frame contained within a document. For example, a document including a comic stripe-style project may include multiple digital canvases; each digital canvas containing a frame of the comic strip. A document can include a single digital canvas, or can include multiple digital canvases.

As used herein, a "design" refers to a group of sub-shapes and paths within a digital canvas. For example, a design can be a simple shape such as a line drawing cloud. A design can also be more complex, such as a house with a roofline, windows, doors, shutters, animals, characters, and so forth. In one or more embodiments, the shape of a design refers to the design's outer-most perimeter.

It follows that, as used herein, a "sub-shape" refers to a shape contained within a design. For example, a design can be made of multiple sub-shapes. In one or more embodiments, sub-shapes may be adjacent to one another within the shape of a design. Additionally, or alternatively, sub-shapes may be layered on top of each other within the shape of design. In at least one embodiment, one or more sub-shapes may be connected by one or more paths. As used herein, a "path" refers to an open-ended line within a design. A design can be made of only paths, can be made of only sub-shapes, or can be made of sub-shapes connected by lines. Additionally, in at least one embodiment, the digital media management system utilizes group information to identify sub-shapes. For example, group information can refer to a group of paths that are grouped together based on a user action within an editing application. In response to receiving this group information related to the paths, the digital media management system can treat the group of paths as a sub-shape.

As used herein, a "base design" or "base sub-shape" refers to an original design or sub-shape that is copied within the same digital canvas or is copied into additional digital canvases within a document. For example, a user may create a base design (e.g., a tree) only to cut-and-paste that design into additional digital canvases (e.g., in order to create a comic stripe-style project including multiple frames of the same scene). Thus, the base design in that example is the first tree created, and the copies of the base design are the trees in the additional digital canvases in the document. In one or more embodiments, the digital media management system determines that a particular design or sub-shape is a base design or base sub-shape based on a comparison of creation timestamps.

As used herein, a "digital canvas data structure" refers to a data structure of a document. For example, a digital canvas data structure associated with a document includes the digital canvases, designs, and sub-shapes that comprise the document. In one or more embodiments, the digital media management system organizes the digital canvas data structure to indicate the positional relationships between the sub-shapes, designs, and digital canvases in the associated document. A digital canvas data structure can be a tree-type data structure with a node hierarchy, web-type data structure with node clusters, a hash table with table cells, or any other type of suitable data structure.

As used herein, a "data entry" refers to a digital canvas data structure entry associated with a particular component of a document. For example, a data entry can be a node associated with a design or sub-shape in a digital canvas of a document. A data entry can include information about the associated design or sub-shape (e.g., x-scale, y-scale, positioning coordinates), as well as metadata related to the design or sub-shape (e.g., creation timestamp, user ID associated with the creator of the design or sub-shape).

As used herein, a "dynamic symbol" refers to a vector-based, flattened design. For example, where designs may be multi-layered, a dynamic symbol includes one layer of paths or lines. In one or more embodiments, the digital media management system automatically maps together all instances of a dynamic symbol in a document. In other words, every instance of a dynamic symbol in a document refers to a single storage position in the associated digital canvas data structure.

As used herein, a "centroid" refers to the geometric center of a design or sub-shape based on points sampled at regular distances along the perimeter of the design or sub-shape. As used herein, a "centroid distance ratio" refers to a feature vector that describes distances of the perimeter of the design or sub-shape to the centroid of the design or sub-shape.

FIGS. 1A-1E illustrate an example of how the digital media management system identifies matching designs across one or more digital canvases, and automatically replaces the matching designs with a generated dynamic symbol. For example, as shown in FIG. 1A, the digital media management system can provide an editing graphical user interface ("GUI") 104 on a display 102 of a client computing device 100. In one or more embodiments, the digital media management system provides the editing GUI 104 via a digital media management system application (e.g., an editing application) installed on the client computing device 100.

The digital media management system provides various tools and other information via menus, palettes, windows, and lists in the editing GUI 104. For example, as shown in FIG. 1A, the digital media management system provides editing tools in the toolkit palette 106. The digital media management system also provides quick access to various tool modifiers in the quick view window 108. For example, in response to selecting a selector tool from the toolkit palette 106 and the symbols tab 110 from the quick view window 108, a user of the client computing device 100 can quickly add one of the displayed dynamic symbols shown under the symbols tab 110 to a digital canvas. Additionally, the digital media management system displays additional information associated with one or more digital canvases in a document in the information window 112. For example, in response to a detected selection of the layers tab 114, the digital media management system provides information about one or more designs in each layer associated with one or more digital canvases in a currently active document.

As further shown in FIG. 1A, the digital media management system provides the active window indicator 116 to indicate the title of a currently active document (e.g., "Document 1") within the editing GUI 104. As discussed above, a document can include one or more digital canvases, and each digital canvas can include one or more designs. Accordingly, as shown in FIG. 1A, the currently active document (e.g., "Document 1") includes the digital canvases 118*a* and 118*b*. The digital canvas 118*a* includes the tree designs 120*a*, 120*b* and the barn design 122*a*, while the digital canvas 118*b* includes the tree designs 120*c*, 120*d* and the bard design 122*b*.

Even though each of the tree designs 120*a*-120*d* and each of the barn designs 122*a*, 122*b* appear virtually identical, the digital media management stores each design separately within a digital canvas data structure associated with the currently active document. As mentioned above, if the user of the client computing device 100 wishes to make a change to the tree designs 120*a*-120*d* (e.g., change the color of the foliage or change the tree to an entirely different design), the user would have to manually enact the change to each of the tree designs 120*a*-120*d*. This manually editing is generally a timely and burdensome process. Additionally, by maintaining each design separately within the digital canvas data structure associated with the currently active document, the digital media management system utilizes a large amount of system memory to store the digital canvas data structure, even though most of the designs therein are copies of each other.

Figure 1B:
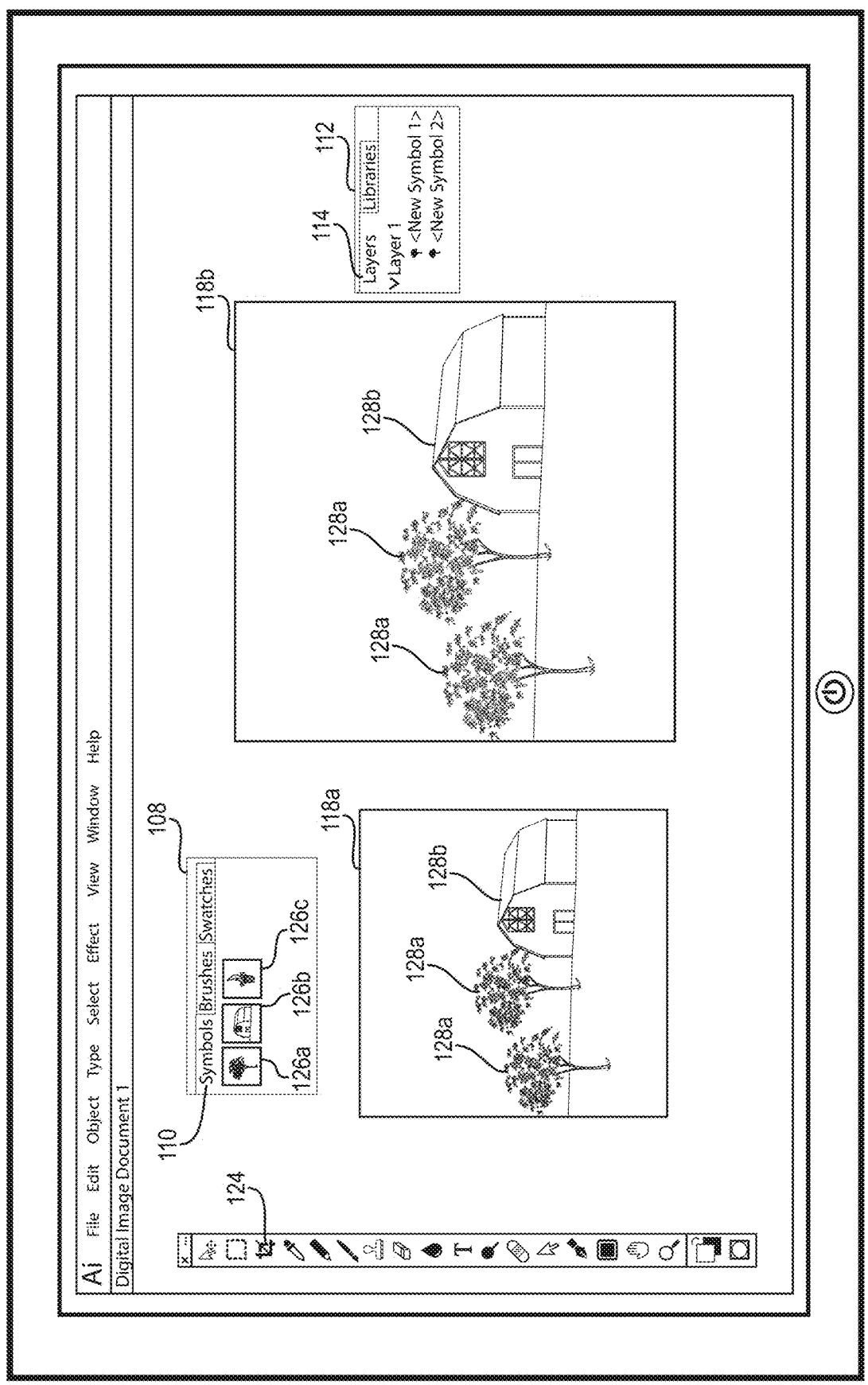

Accordingly, in order to enable rapid editing and minimize storage requirements associated with the currently active document, the digital media management system provides for automatic symbol detection and conversion. For example, as shown in FIG. 1B, in response to a detected trigger (e.g., opening of the document or selection of a particular tool or option), the digital media management system identifies all matching designs in the digital canvases 118*a*, 118*b*, generates a dynamic symbol for each set of matching designs, and replaces the identified designs in the digital canvases 118*a*, 118*b* with their associated dynamic symbol.

To illustrate, in response to the detected selection of the dynamic symbol conversion tool 124, the digital media management system identifies the tree designs 120*a*, 120*b*, 120*c*, and 120*d* (e.g., as shown in FIG. 1A) as matching designs based on comparing the centroid distance ratios of the tree designs 120*a*, 120*b*, 120*c*, and 120*d*. The digital media management system further identifies the barn designs 122*a*, 122*b* (e.g., as shown in FIG. 1A) as another set of matching designs. The process by which the digital media management system identifies matching designs using centroid distance ratios is described in greater detail below with regard to FIG. 2.

The digital media management then generates a first dynamic symbol associated with the set of matching tree designs 120*a*-120*d*, and a second dynamic symbol associated with the set of matching barn designs 122*a*, 122*b*. For example, as shown in FIG. 1B, the digital media management system generates the first dynamic symbol indicated by the dynamic symbol icon 126*a*, and the second dynamic symbol indicated by the dynamic symbol icon 126*b*. The digital media management system adds the new dynamic symbol icons 126*a*, 126*b* to the already existing dynamic symbol icon 126*c* under the symbol tab 110.

Additionally, in response to generating the new dynamic symbols associated with the sets of matching designs, the digital media management system further automatically replaces the instances of the matching designs in the digital canvases 118*a*, 118*b* with their associated dynamic symbols. For example, as shown in FIG. 1B, the digital media management system replaces the tree designs 120*a*-120*d* with the associated dynamic symbol 128*a*, and the barn designs 122*a*, 122*b* with the associated dynamic symbol 128*b*. This automatic replacement of designs with dynamic symbols is further reflected under the layers tab 114 in the information window 112, where it shows that the previously listed designs are now dynamic symbols. The process by which the digital media management system identifies matching designs, generates dynamic symbols, and performs automatic replacement is further described below with reference to FIG. 2.

Figure 1C:
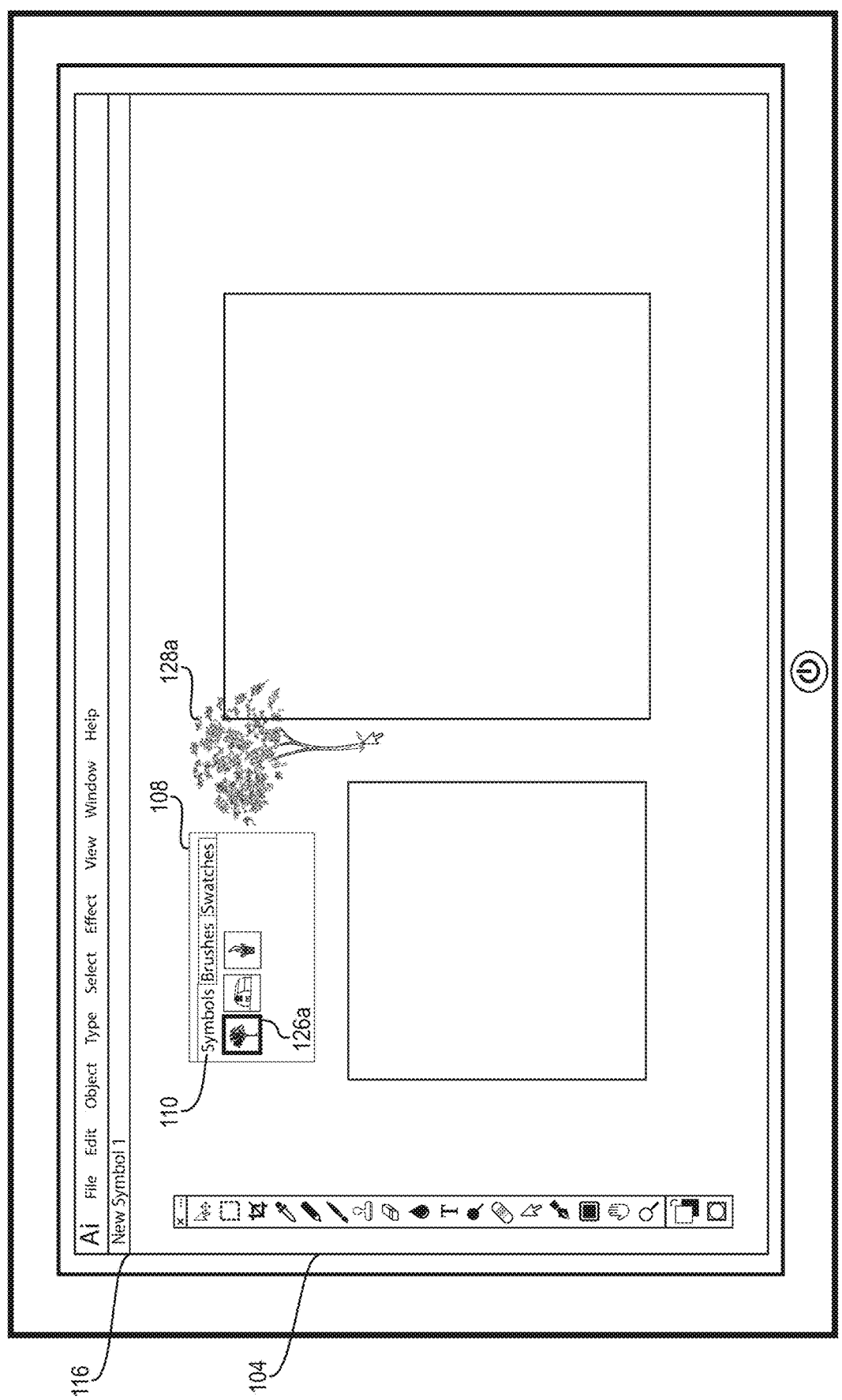

With the copied designs in the digital canvases 118*a*, 118*b* now replaced with dynamic symbols, the digital media management system can enable rapid editing and other functionality not previously available across the digital canvases 118*a*, 118*b*. For example, as shown in FIG. 1C, in response to a detected selection of the dynamic symbol icon 126*a* under the symbol tab 110 in the quick view window 108, the digital media management system can provide the dynamic symbol 128*a* associated with the dynamic symbol icon 126*a* for editing. As indicated by the active window indicator 116 (e.g., "New Symbol 1"), the dynamic symbol 128*a* corresponding to the selected dynamic symbol icon 126*a* is currently available for editing in the editing GUI 104.

Figure 1D:
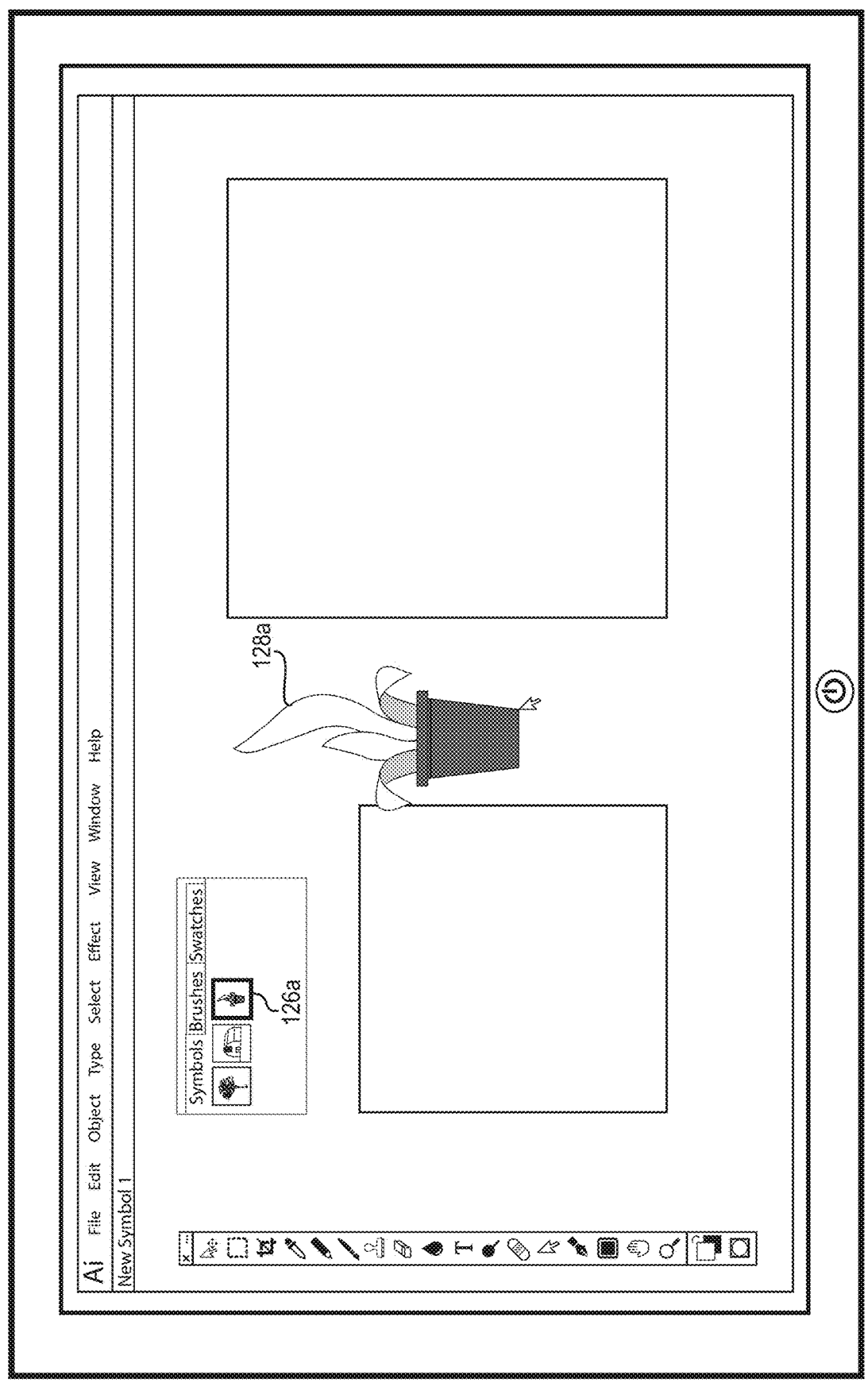

In one or more embodiments, with the dynamic symbol 128*a* available for editing in the editing GUI 104, the digital media management system can enable a variety of edits in connection with the dynamic symbol 128*a*. For example, the digital media management system can enable sizing edits, color and shading edits, color opacity edits, line-width and pattern edits, and so forth. In one embodiment, as shown in FIG. 1D, the digital media management system can enable the replacement of the dynamic symbol 128*a* with another dynamic symbol or design. For example, in response to the detected selection of the dynamic symbol icon 126*c* while the dynamic symbol 128*a* is available for editing in the editing GUI 104, the digital media management system can alter the dynamic symbol 128*a* to match the dynamic symbol associated with the selected dynamic symbol icon 126*c*.

Figure 1E:
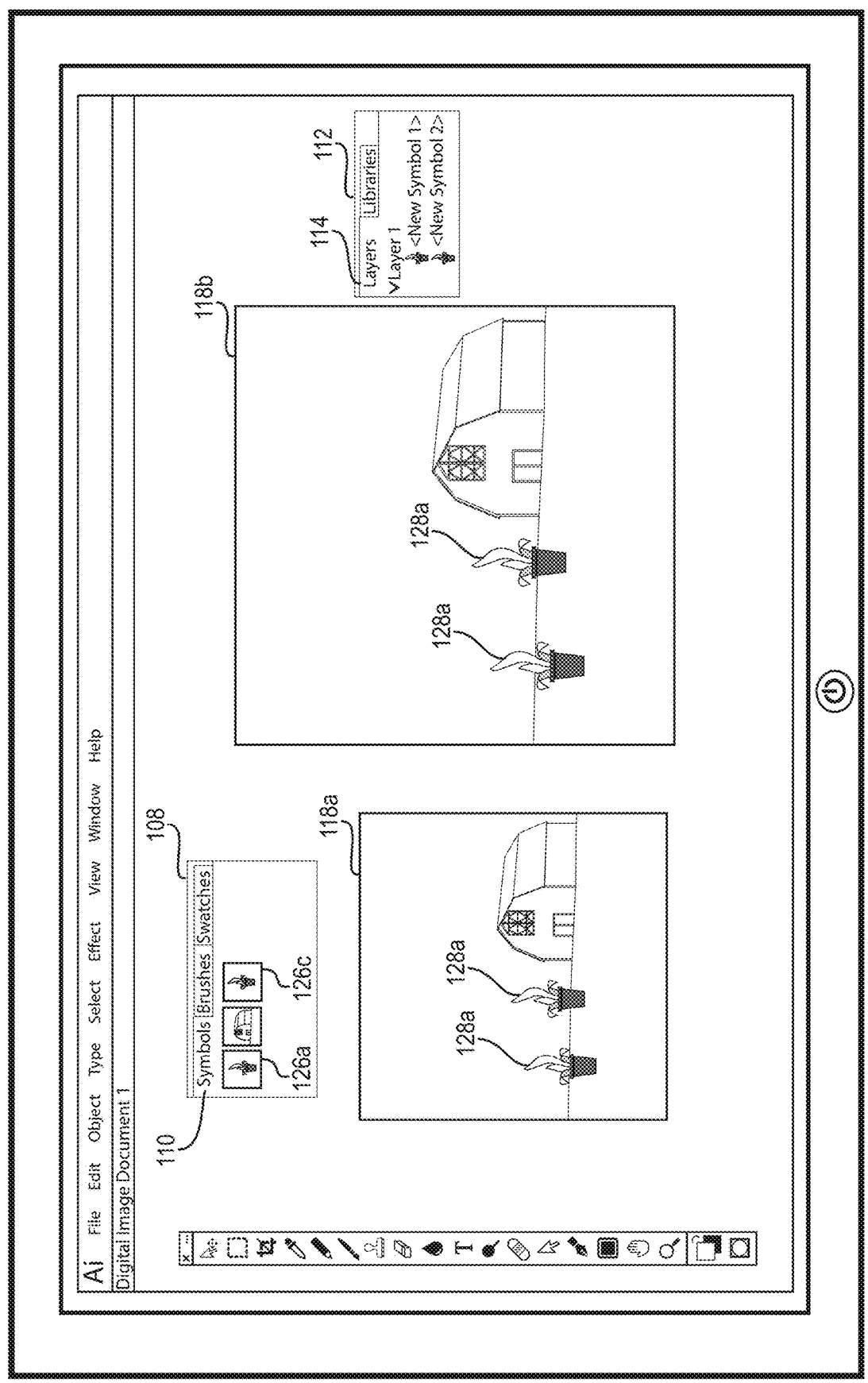

In response to this change to the dynamic symbol 128*a*, the digital media management system automatically updates every instance of the dynamic symbol 128*a* within the active document. For example, as shown in FIG. 1E, in response to the detected completion of one or more edits to the dynamic symbol 128*a*, the digital media management system automatically updates every instance of the dynamic symbol 128*a* within the digital canvases 118*a*, 118*b*. In one or more embodiments, as further shown in FIG. 1E, the digital media management system also automatically updates all related instances of the dynamic symbol 128*a* including the dynamic symbol icon 126*a* under the symbols tab 110 in the quick view window 108, and in the information listed under the layers tab 114 in the information window 112. As shown, the digital media management system enables the replacement to multiple instances of the dynamic symbol in response to a single detected selection from the user. While FIG. 1E illustrates a replace action, the digital media management system allows for other changes such those mentioned above.

FIGS. 1A-1E illustrate a simplified example for purposes of explanation. In additional embodiments, the digital media management system can identify matching designs in more complex configurations. For example, in another embodiment, a document may include multiple digital canvases, each with multiple cloud designs. For instance, some cloud designs may be enlarged, while others are reduced. Similarly, some cloud designs may be rotated. In one or more embodiments, the digital media management system can automatically identify matching cloud designs across all of the multiple digital canvases in the manner described above with reference to FIGS. 1A-1E, and further described below with reference to FIG. 2. If the digital media management system determines that a particular cloud design does not match the other cloud designs (e.g., due to warping), the digital media management system can disregard that particular cloud design.

In one or more embodiments, after identifying matching cloud designs, the digital media management system maps the matching cloud designs within the associated digital canvas data structure, generates a dynamic symbol associated with the matching cloud designs, and replaces the matching cloud designs with the generated dynamic symbol while maintaining existing restraints (e.g., a shape a replaced cloud design). At this point, as discussed above, the digital media management system automatically applies any change made to the generated dynamic symbol to each instance of the dynamic symbol within the digital canvases of the document.

Figure 2:
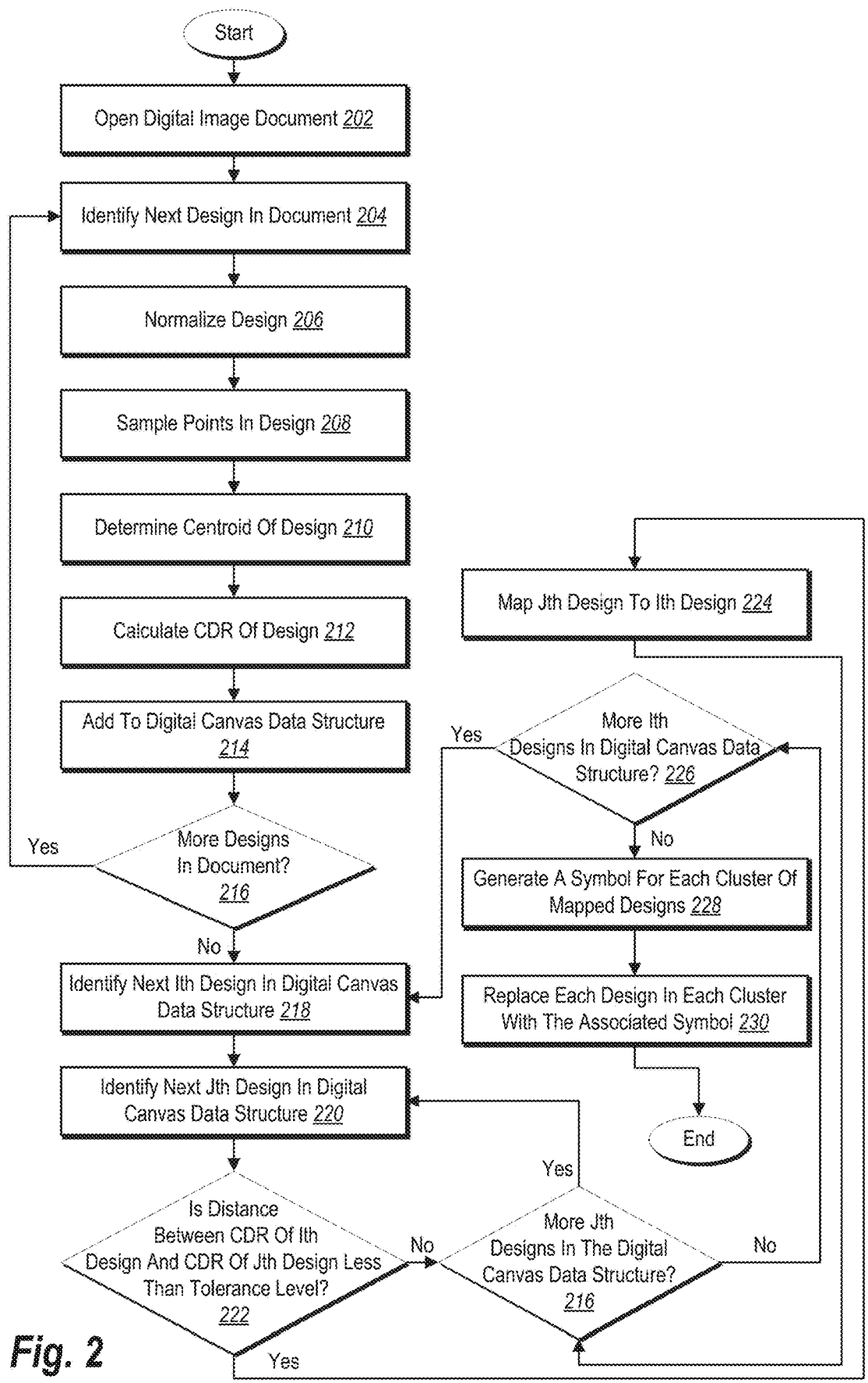
FIG. 2 illustrates a sequence diagram of a process of replacing matching designs in a document with a generated symbol in accordance with one or more embodiments.

FIG. 2 illustrates an example sequence of acts involved in replacing matching designs in one or more digital canvases with a dynamic symbol, as described above with reference to FIGS. 1A-1E. For example, as shown in FIG. 2, the sequence of acts can begin with the act 202 of opening a document. In one or more embodiments, the digital media management system detects the opening of a document in response to a user selection of a file corresponding to the document from a list of files associated with the digital media management system application. As discussed above, the document can include one or more digital canvases, and each digital canvas can include multiple designs. Every design in the document has a shape, and can include multiple sub-shapes connected by paths.

In response to detecting the opening of the document 202, the digital media management system generates a digital canvas data structure. In alternative embodiments, the digital media management system may not generate the digital canvas data structure in response to the document being opening, but rather, may generate the digital canvas data structure in response to a detected selection of one or more available tools, or in response to a detected selection of a digital canvas or design within the document. In one or more embodiments, regardless of the action that triggers the generation of the digital canvas data structure, the digital media management system generates the digital canvas data structure associated with the document prior to matching designs within the document.

In order to generate the digital canvas data structure associated with the document, the digital media management system performs the act 204 of identifying a next design in the document. As described above, to generate the digital canvas data structure associated with a document, the digital media management system iterates through all the designs within the document. Accordingly, in the first iteration, the digital media management system identifies the next design in the document 204 by identifying a first design in a first digital canvas within the document. More specifically, in at least one embodiment, the digital media management system iterates through designs in a document based on creation timestamps associated with each design. Thus, in that embodiment and in the first iteration, the digital media management system identifies the next design in the document 204 by identifying the design within the document with the earliest creation timestamp.

After identifying the next design in the document 204, the digital media management system performs the act 206 of normalizing the identified design. In one or more embodiments, in order to minimize the calculation space associated with a design and its sub-shapes, the digital media management system normalizes the designs stored in the digital canvas data structure to a standard size. Thus, for some designs and sub-shapes, the digital media management system may perform the act of normalization by enlarging the size of the design and/or sub-shape. For other designs and sub-shapes, the digital media management system may normalize the design and/or sub-shape by reducing the size of the design and/or sub-shape. For example, the digital media management system can normalize the identified design by enlarging or reducing the size of the design until it is fitted to a standard R×R sized grid (e.g., the grid may be 60 pixels by 60 pixels).

Next, the digital media management system performs the act 208 of sampling points in the now-normalized design. In one or more embodiments, the digital media management system samples points in the design by identifying any number of points at equal distances along the perimeter of the design. Alternatively, the digital media management system may sample points in the design by identifying a predetermined number of points at equal distances along the perimeter of the design.

After sampling points in the design, the digital media management system performs the act 210 of determining a centroid of the design. As discussed above, the centroid of a design is the geometric center of the design. In one or more embodiments, the digital media management system determines the centroid of the design by identifying coordinates associated with each sampled point in the design, and dividing each coordinate by the number of sampled points. This process is described further below with reference to FIG. 3.

Once the digital media management system has determined the centroid of the design, the digital media management system performs the act 212 of calculating the centroid distance ratio ("CDR") of the design. As discussed above, the CDR of a design can also be described as a feature vector of the design. In one or more embodiments, the digital media management system calculates the CDR of the design by first identifying the distance from each sampled point of the design to the centroid of the design. The digital media management system then sorts the distances in either ascending or descending order. Next, the digital media management system takes ratios of the first distance and the last distance, the second distance and the second to last distance, the third distance and the third to last distance, and so forth until all distances are accounted for or until a predetermined number of ratios (e.g., 20) are determined. In one or more embodiments, the resulting sequence of ratios is the CDR or feature vector of the design. This process is further described below with reference to FIG. 3.

After calculating the CDR of the design, the digital media management system performs the act 214 of adding the design to the digital canvas data structure. In one or more embodiments, the digital media management system adds the design to the digital canvas data structure as a node or bucket associated with the digital canvas in which the design is included. In at least one embodiment, the digital media management system adds additional metadata associated with the design to the same node or bucket in the digital canvas data structure. This metadata can include, but is not limited to, the calculated CDR for the design, the creation timestamp associated with the design, the original x-scale and y-scale associated with the design (e.g., prior to the normalization process described above), and a number of sub-shapes and paths associated with the design.

As mentioned above, the digital media management system generates the digital canvas data structure by iterating through all designs and sub-shapes associated with a document. Accordingly, after adding a particular design to the digital canvas data structure (e.g., in acts 206-214), the digital media management system performs the act 216 of determining whether additional designs exist in the document. In one or more embodiments, the digital media management system determines whether additional designs exist in the document by identifying a design in the document associated with a creation timestamp that is later than the creation timestamp associated with the last design added to the digital canvas data structure. If an additional design exists in the document (e.g., "Yes"), the digital media management system again performs the acts 204-214 with the next design in the document.

If an additional design does not exist in the document (e.g., "No"), the digital media management system begins the process of identifying matching designs within the digital canvas data structure. In one or more embodiments, as shown in FIG. 2, the digital media management system automatically identifies matching designs in the digital canvas data structure in response to the generation of the digital canvas data structure. In additional or alternative embodiments, the digital media management system may automatically identify matching designs in response to other triggers. For example, the digital media management system may identify matching designs within the digital canvas data structure in response to a detected selection of a tool within the digital media management system application, or in response to a detected selection of a particular design within the document.

In at least one embodiment, the digital media management system identifies all matching designs within the digital canvas data structure. For example, as shown in FIG. 2, the digital media management system can begin by performing the act 218 of identifying the next "i-th" design in the digital canvas data structure. If the digital media management system is in the first iteration of the matching process, the digital media management system can identify the i-th design as the design in the digital canvas data structure with the earliest timestamp. In at least one embodiment, the digital media management system can identify the i-th design as a "base design."

Next, the digital media management system performs the act 220 of identifying the next "j-th" design in the digital canvas data structure. For example, in at least one embodiment, the digital media management system identifies the j-th design by identifying a design in the digital canvas data structure with a creation timestamp that is later than the creation timestamp of the i-th design. Alternatively, if the digital canvas data structure is a tree and leaf type of data structure, the digital media management system can identify the j-th design as the next closest design to the i-th design within the digital canvas data structure.

With the i-th and j-th designs identified, the digital media management system performs the act 222 of determining whether the distance between the CDR of the i-th design and the CDR of the j-th design is less than a predetermined tolerance level. For example, in one or more embodiments, the digital media management system performs the act 222 by calculating the Euclidean distance between the CDRs of the i-th design and the j-th design. The process by which the digital media management system calculates the distance between the CDRs of the i-th design and the j-th design is described in further detail below with regard to FIG. 3. In at least one embodiment, if the determined distance is less than 1.5 (e.g., "Yes"), the digital media management system determines that the j-th design matches the i-th design. If the determined distance is not less than the predetermined tolerance level (e.g., "No"), the digital media management system identifies the next j-th design in the digital canvas structure (220).

In response to determining that the determined distance is less than the predetermined tolerance level (e.g., "Yes" in the act 222) and matching the j-th design to the i-th design, the digital media management system performs the act 224 of mapping the j-th design to the i-th design in the digital canvas data structure. In one or more embodiments, the digital media management system maps the j-th design to the i-th design by adding a pointer or reference to the i-th design into the metadata associated with the j-th design. Additionally, or alternatively, the digital media management system can map the j-th design to the i-th design by changing the position or bucket in which the j-th design is stored within the digital canvas data structure such that the j-th design is directly associated with the i-th design within the digital canvas data structure (e.g., as a child-node of a node associated with the i-th design in the digital canvas data structure).

It is possible that multiple j-th designs within the digital canvas data structure match the i-th design. Accordingly, after mapping the j-th design to the i-th design, the digital media management system performs the act 216 by determining whether more j-th designs exist in the digital canvas data structure. If there are additional j-th designs (e.g., "Yes"), the digital media management system performs the acts 220-224 with the additional j-th designs.

After the i-th design has been compared to every j-th design in the digital canvas data structure (e.g., "No" to the act 216), the digital media management system performs the act 226 of determining whether more i-th designs exist in the digital canvas data structure. If additional i-th designs exist in the digital canvas data structure (e.g., "Yes"), the digital media management system performs the acts 218-224 in connection with the additional i-th designs. If additional i-th designs do not exist in the digital canvas data structure (e.g., "No"), the digital media management system determines that the matching algorithm is complete. In at least one embodiment, the digital media management system does not perform the acts 222 and 224 with i-th and j-th design that have been matched at least once. Accordingly, the matching algorithm speeds up in subsequent iterations as i-th and j-th pairs of matched designs are removed from consideration.

In response to completing the matching algorithm, the digital media management system performs the act 228 of generating a symbol for each cluster of mapped designs 228. For example, in one or more embodiments, the digital media management system identifies all base designs within the digital canvas data structure (e.g., designs to which other designs are mapped), and generates a dynamic symbol for each base design. In at least one embodiment, the digital media management system generates a dynamic symbol for a base design by "flattening" the base design. In other words, the digital media management system identifies all the sub-shapes and paths within the base design and combines the identified paths and sub-shapes into a single layer, vector-based dynamic symbol.

After generating a dynamic symbol for each cluster of mapped designs in the digital canvas data structure, the digital media management system performs the act 230 of replacing each design in each cluster with the associated dynamic symbol. In one or more embodiments, the digital media management system performs this replacement by, for each design in each cluster, removing the data entry (e.g., the node, table cell) associated with the design and its associated metadata from the digital canvas data structure, and adding a pointer to the dynamic symbol within the digital canvas data structure in the same place as the removed data entry.

As just described, the digital media management system can match a subset of designs remaining in one or more digital canvases to at least one base design identified from the one or more digital canvases. The digital media management system further replaces all the matching designs (e.g., the base design in addition to the subset of remaining designs) with a generated dynamic symbol. Accordingly, in addition to the other disclosure herein, the acts (e.g., the acts 202-230) and algorithms discussed in relation to FIG. 2 can comprise a corresponding structure for a step for matching a subset of the remaining one or more designs within the digital canvas data structure to the at least one base design.

Figure 3A:
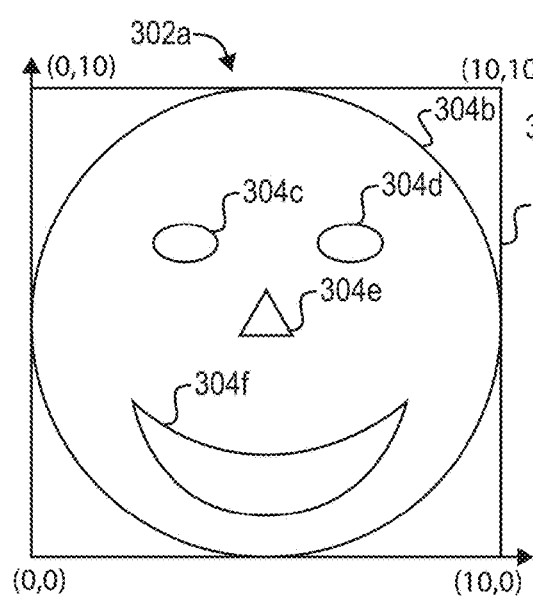
FIGS. 3A-3D illustrate diagrams showing an example of determining centroid distance ratios of designs and determining whether the designs match in accordance with one or more embodiments.
Figure 3B:
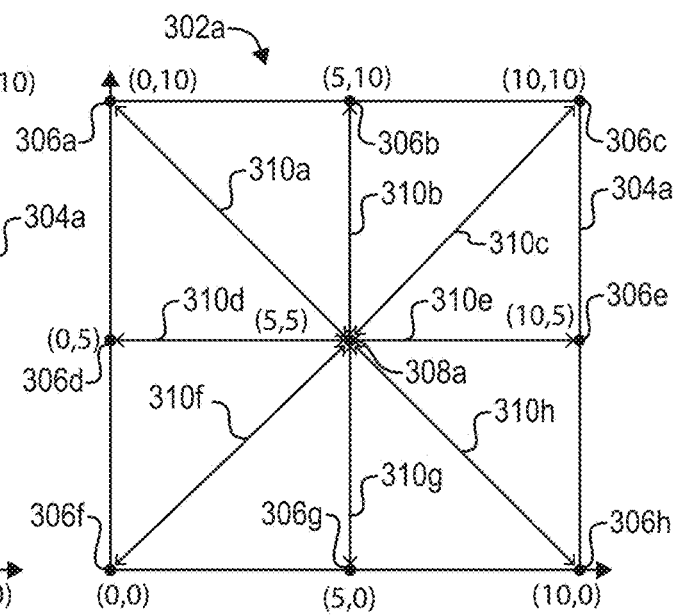

FIGS. 3A-3B illustrates an example of determining a centroid distance ratio ("CDR") of a design. As discussed above, in one or more embodiments, the digital media management system determines a CDR of a design, and stores the design's CDR as part of the metadata associated with the design in the digital canvas data structure. As shown in FIG. 3A, the design 302a includes the sub-shape 304a (e.g., a square), the sub-shape 304b (e.g., a circle inside the square), the sub-shapes 304c and 304d (e.g., two ovals), the sub-shape 304e (e.g., a triangle), and the sub-shape 304f (e.g., a half-moon). In one or more embodiments, the shape of the design 302a is the perimeter of the design 302a, which in this case is the sub-shape 304a (e.g., the square). As shown in FIG. 3A, the design 302a is fitted to X and Y axes, and the corners of the shape of the design 302a (i.e., the corners of the sub-shape 304a), are shown at the x-y coordinates (0,10), (10,10), (0,0), and (10,0). Accordingly, the sub-shape 304a is a 10×10 square.

In order to determine the CDR of the design 302a, the digital media management system begins by sampling points around the perimeter of the design 302a. For example, as shown in FIG. 3B, the digital media management system samples the points 306a-306h along the perimeter of the sub-shape 304a, which is also the perimeter of the design 302a (where the sub-shapes 304b-304f have been removed for purposes of explanation). In the embodiment shown in FIG. 3B, the digital media management system samples the points 306a-306h at equal distances along the perimeter of the design 302a. Accordingly, the digital media management system samples the point 306a at the coordinates (0,10), the point 306b at the coordinates (5,10), the point 306c at the coordinates (10,10), the point 306d at the coordinates (0,5), the point 306e at the coordinates (10,5), the point 306f at the coordinates (0,0), the point 306g at the coordinates (5,0), and the point 306h at the coordinates (10,0).

Next, the digital media management system identifies the centroid 308a of the design 302a. In one or more embodiments, the digital media management system identifies the x-coordinate of the centroid of a design by adding together the x-coordinates of all the sampled points, and then dividing the total by the number of sampled points. Similarly, the digital media management system identifies the y-coordinate of the centroid of a design by adding together the y-coordinates of all the sampled points, and then dividing the total by the number of sampled points. In the embodiment shown in FIG. 3B, the digital media management system identifies the x-coordinate of the centroid 308a as:

$$\frac{0+5+10+0+10+0+5+10}{8} = 5.$$

Similarly, the digital media management system identifies the y-coordinate of the centroid 308a as:

$$\frac{10+10+10+5+5+0+0+0}{8} = 5.$$

With the sampled points 306a-306h and the centroid 308a, the digital media management system can calculate the centroid distance ratio ("CDR") of the design 302a. For example, in one or more embodiments, the digital media management system first determines the distance from each sampled point 306a-306h to the centroid 308a. In the embodiment illustrated in FIG. 3B, the distance from the point 306a to the centroid 308a is $\sqrt{50}$ (e.g., $\sqrt{5^2+5^2}$, indicated by the line 310a), the distance from the point 306b to the centroid 308a is 5 (e.g., indicated by the line 310b), the distance from the point 306c to the centroid 308a is $\sqrt{50}$ (e.g., indicated by the line 310c), the distance from the point 306d to the centroid 308a is 5 (e.g., indicated by the line 310d), the distance from the point 306e to the centroid 308a is 5 (e.g., indicated by the line 310e), the distance from the point 306f to the centroid 308a is $\sqrt{50}$ (e.g., indicated by the line 310f), the distance from the point 306g to the centroid 308a is 5 (e.g., indicated by the line 310g), and the distance from the point 306h to the centroid 308a is $\sqrt{50}$ (e.g., indicated by the line 310h).

Next, the digital media management system lists the determined distances in order. Accordingly, in the embodiment illustrated in FIG. 3B, the determined distances in order are: $\sqrt{50}$, $\sqrt{50}$, $\sqrt{50}$, $\sqrt{50}$, 5, 5, 5, and 5. While, in the embodiment illustrated in FIG. 3B, the digital media management system lists the distances in descending order, in other embodiments, the digital media management system may list the distances in ascending order.

After ordering the determined distances, the digital media management system takes ratios of pairs of distances in the ordered list of determined distances. For example, in one or more embodiments, for an ordered list of N distances, the digital media management system takes the ratio of the $1^{st}$ distance and the Nth distance, the ratio of the $2^{nd}$ distance and the N−1th distance, the ratio of the $3^{rd}$ distance and the N−2th distance, and so forth. Accordingly, in the embodiment illustrated in FIG. 3B, the digital media management system takes the following ratios:

$$\frac{\sqrt{50}}{5}, \frac{\sqrt{50}}{5}, \frac{\sqrt{50}}{5}, \text{ and } \frac{\sqrt{50}}{5}.$$

In at least one embodiment, this list of ratios is the CDR, or feature vector, of the design 302a. Additionally, in one or more embodiments as described above, the digital media management system stores this calculated CDR as metadata associated with the design 302a within the digital canvas data structure.

Figure 3C:
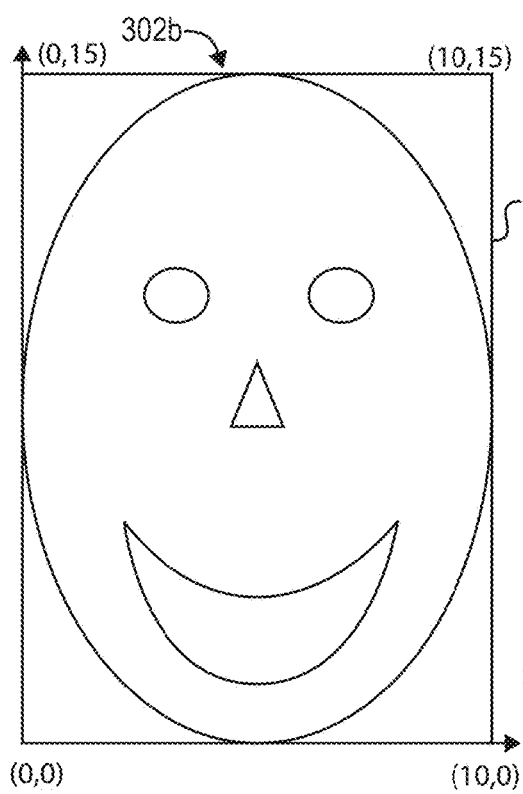
Figure 3D:
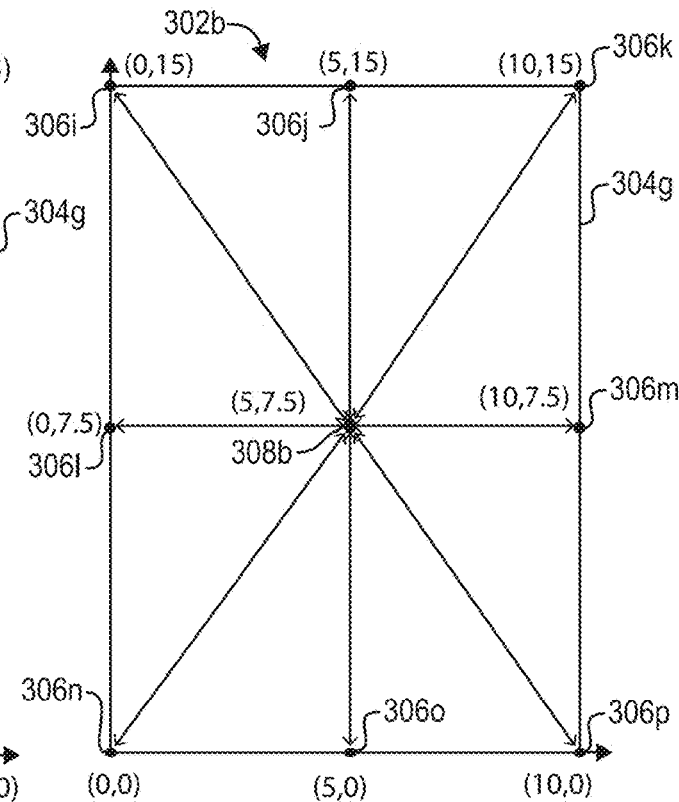

As mentioned above, the digital media management system utilizes calculated CDRs associated with designs in a matching algorithm to determine whether a match exists between the designs. As shown in FIG. 3C, the design 302b is a warped copy of the design 302a. In the embodiment shown, the design 302b is warped by having been stretched vertically along the y-axis by 5 units. Accordingly, as shown in FIG. 3D, the perimeter of the design 302b (e.g., corresponding to the sub-shape 304g) has corners at the coordinates (0,15), (10,15), (0,0), and (10,0).

In one or more embodiments, the digital media management system samples the points 306i-306p and identifies the centroid 308b in the manner described above with reference to FIG. 3B. Similarly, in manner described above with reference to FIG. 3B, the digital media management system determines the ordered distances between the sampled points 306i-306p and the centroid 308b as: $\sqrt{81.25}$, $\sqrt{81.25}$, $\sqrt{81.25}$, $\sqrt{81.25}$, 7.5, 7.5, 5, and 5. It follows that, in the manner described above with reference to FIG. 3B, the digital media management system calculates the CDR for the design 302b as:

$$\frac{\sqrt{81.25}}{5}, \frac{\sqrt{81.25}}{5}, \frac{\sqrt{81.25}}{7.5}, \text{ and } \frac{\sqrt{81.25}}{7.5}.$$

In one or more embodiments, the digital media management system stores this calculated CDR as metadata associated with the design 302b in the digital canvas data structure.

In one or more embodiments, the digital media management system determines whether the design 302b matches the design 302a by finding the distance between the CDR calculated for the design 302a and the CDR calculated for the design 302b. In at least one embodiment, the digital media management system can determine the distance between the two CDRs as a vector distance. For example:

Let $\vec{u}, \vec{v} \in \mathbb{R}^n$

Then the Distance between $\vec{u}$ and $\vec{v}$ is $$d(\vec{u}, \vec{v}) = \|\vec{u}, \vec{v}\| = \sqrt{(u_1 - v_1)^2 + (u_2 - v_2)^2 \ldots (u_n - v_n)^2}$$

Utilizing this methodology, the digital media management system can calculate the distance between the CDR for the design 302a and the CDR for the design 302b is ~0.6265.

As mentioned above, the digital media management system determines that two designs match if the distance between their CDRs is less than a predetermined tolerance level. In one or more embodiments, the digital media management system utilizes a predetermined tolerance level of 1.5. Accordingly, because the calculated distance between the CDRs of the design 302a, and 302b is 0.6265, which is less than the tolerance level of 1.5, the digital media management system can determine that the design 302b matches the design 302a. Because the design 302b was created after the design 302a, the digital media management system utilizes the design 302a as a base design, and maps the design 302b to the design 302a in the digital canvas data structure. At this point, the digital media management system can enable various tools (e.g., dynamic symbol replacement, automatic edit application) in connection with the designs 302a, 302b based on their mapping.

As mentioned above, the digital media management system utilizes the matching algorithm to enable additional tools within a digital media management system application installed on a client-computing device. For example, in addition to identifying matching designs across one or more digital canvases, as described above with reference to FIGS. 1A-1E, the digital media management system also identifies matching sub-shapes across designs. After identifying one or more matching sub-shapes across two or more designs, the digital media management system can map corresponding sub-shapes together in order to enable automatic application of edits across the corresponding sub-shapes.

Figure 4A:
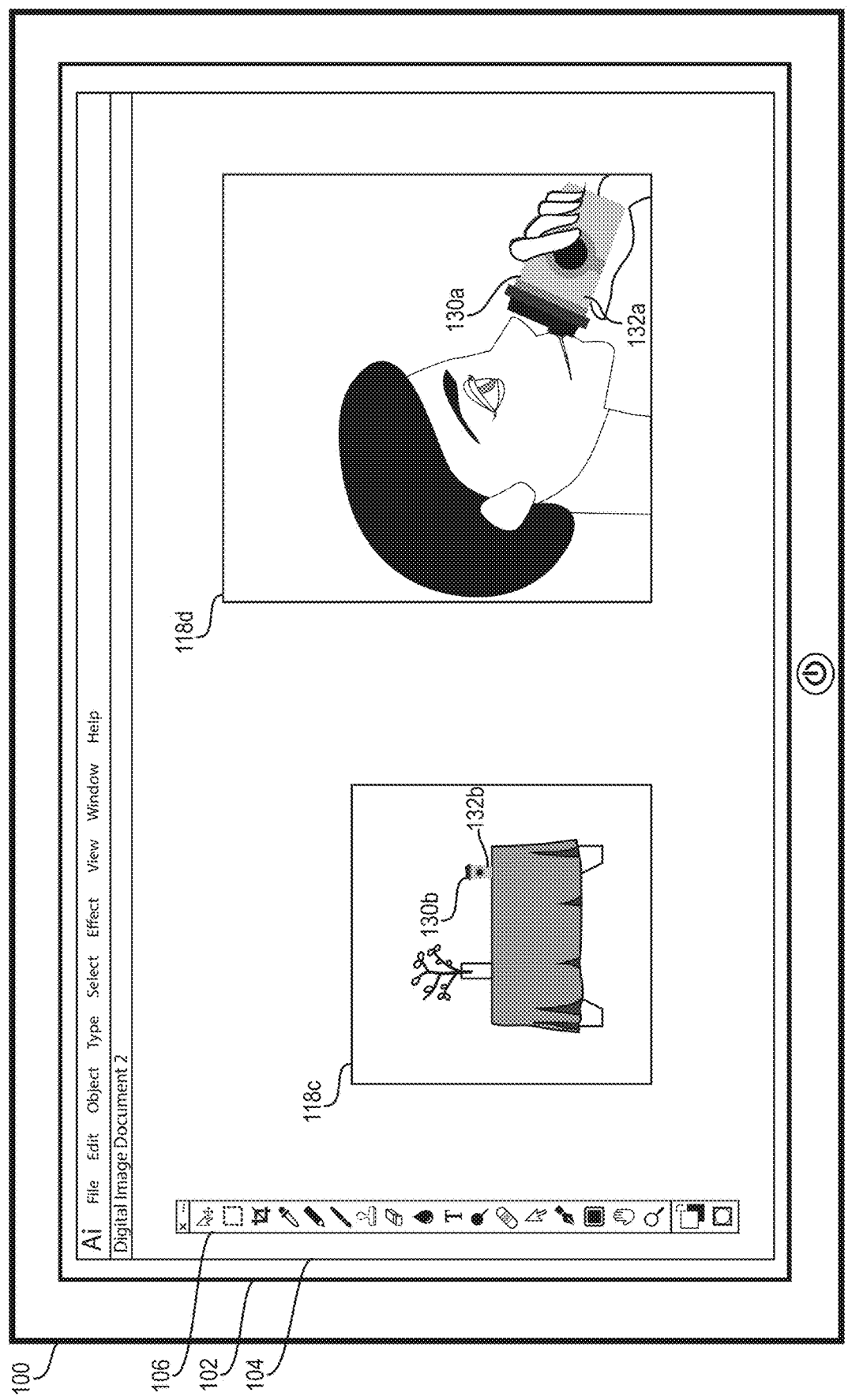
FIGS. 4A-4E illustrate example graphical user interfaces illustrating manipulation of sub-shapes of a design in accordance with one or more embodiments.

FIGS. 4A-4E illustrate an example of how the digital media management system identifies matching sub-shapes across two or more designs, even when some level of deformation exists between the identified sub-shapes. For example, in FIG. 4A, as with FIG. 1A described above, the digital media management system provides the editing GUI 104 on the display 102 of the client computing device 100. In one or more embodiments, the digital media management system provides the editing GUI 104 via a digital media management system application installed on the client computing device 100. As shown in FIG. 4A, the editing GUI 104 includes the toolkit palette 106 and the digital canvases 118c, 118d as part of the currently active "Document 2," indicated by the active window indicator 116.

As further illustrated in FIG. 4A, the digital canvas 118c includes various designs including a cup design 130b. Additionally, the digital canvas 118d also includes a cup design 130a. In one or more embodiments, the cup design 130b is a copy of the cup design 130a. In at least one embodiment, the digital media management system identifies the cup design 130a as a base design, relative to the cup design 130b. For example, the digital media management system can determine that the cup design 130a is a base design relative to the cup design 130b based on creation timestamps associated with each design. For instance, the digital media management system can determine that the cup design 130a is the base design of the cup design 130b in response to determining that the cup design 130a is associated with an earlier creation timestamp than that of the cup design 130b.

As shown in FIG. 4A, the cup designs 130a and 130b are each composed of multiple sub-shapes. For example, among other sub-shapes, the cup design 130a includes the sub-shape 132a, while the cup design 130b includes the sub-shape 132b. In one or more embodiments, the sub-shapes 132a and 132b are rectangular shapes fitted together with other sub-shapes so as to represent the main cup-portion of the cup designs 130a, 130b. As shown in FIG. 4A, the sub-shape 132b is has a different size and rotational attitude from the sub-shape 132a.

As discussed above, even though the cup design 130b is a copy of the cup design 130a, the digital media management system treats the two designs separately within the digital canvas data structure associated with the currently active document (e.g., the "Document 2"). Accordingly, at this point, any edit that the user of the client computing device 100 wishes to make to the cup design in all digital canvases within the currently active document would have to be made manually to each copy of the cup design.

Figure 4B:
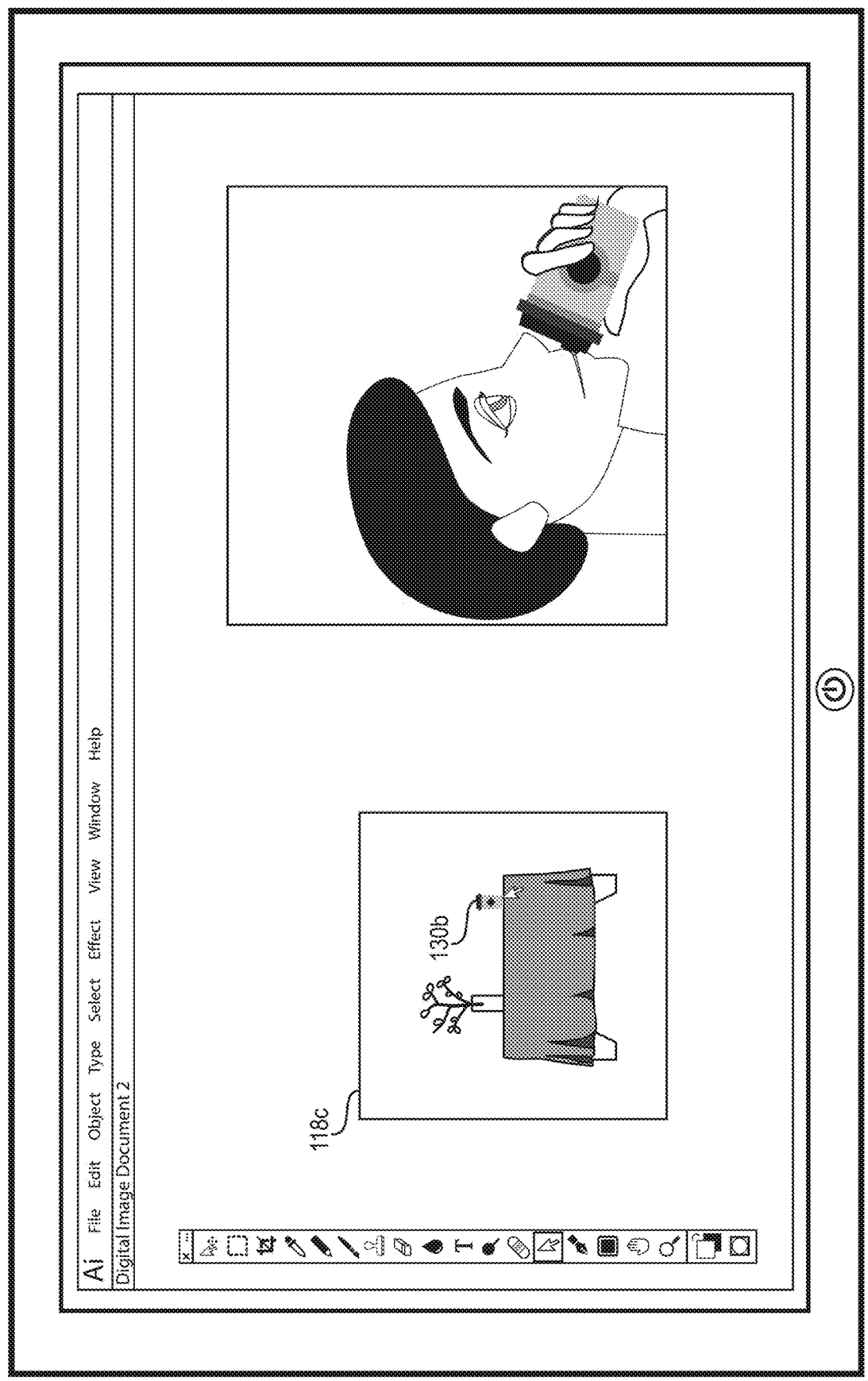
Figure 4C:
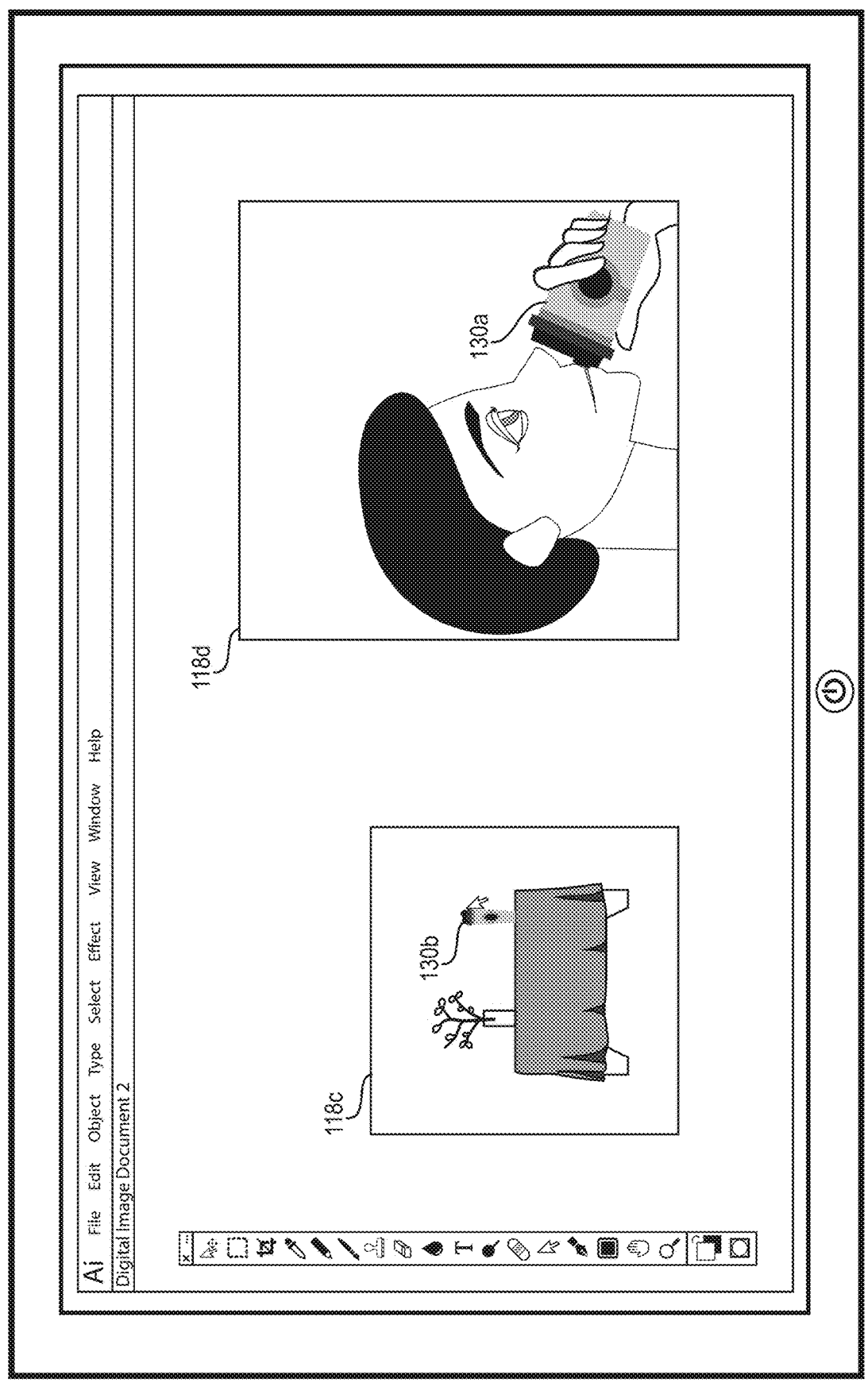

For example, as shown in FIG. 4B, in response to a detected selection and manipulation (e.g., press-and-hold gesture plus a vertical drag motion) of the cup design 130b in the digital canvas 118c, the digital media management system can warp the cup design 130b, such that it appears taller, as in FIG. 4C. In one or more embodiments, as shown in FIG. 4C, the digital media management system does not automatically apply the detected warp edit to the cup design 130a in the digital canvas 118d because, as discussed above, the cup design 130a and the cup design 130b are separately stored within the digital canvas data structure associated with the currently active document.

Figure 4D:
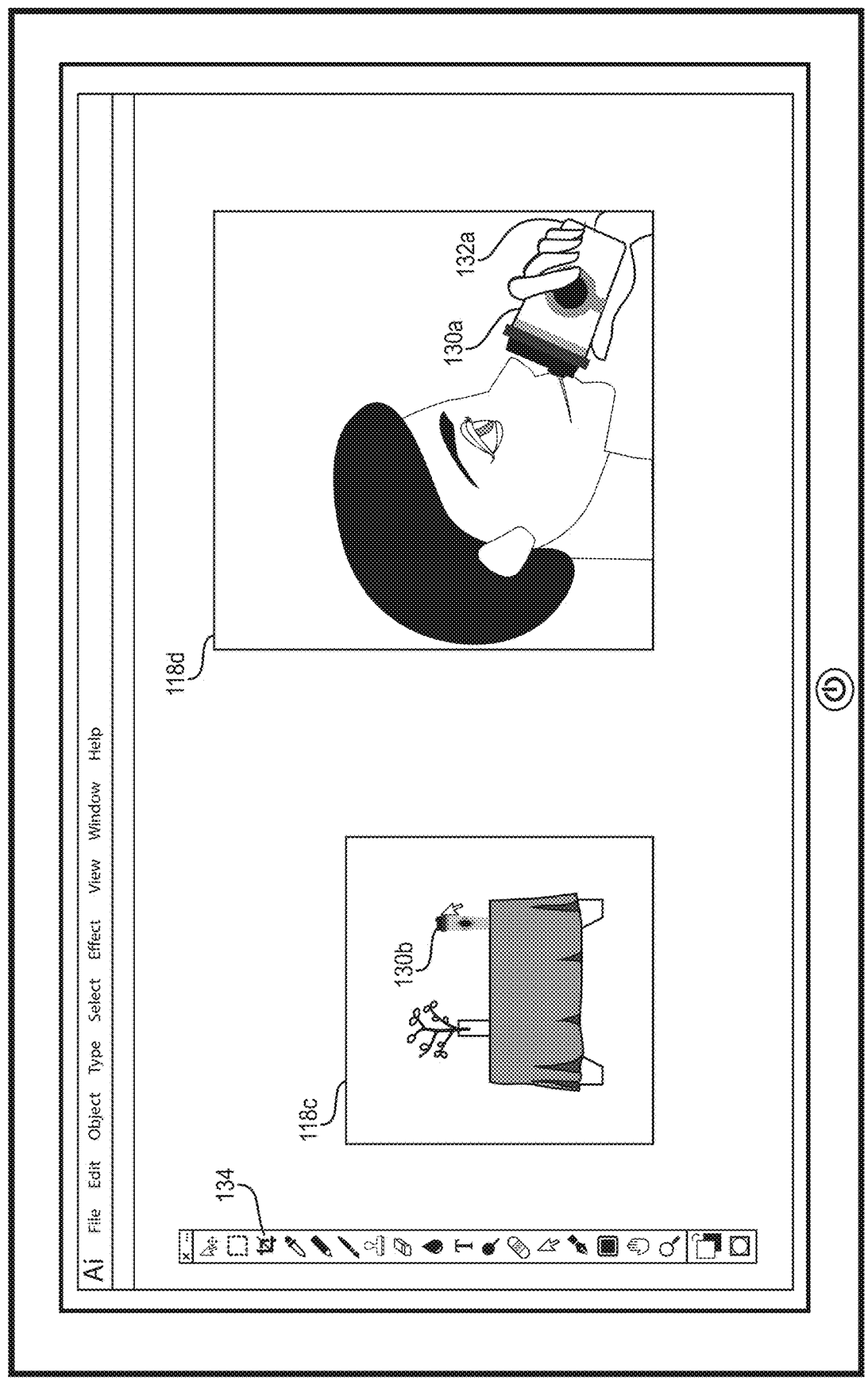

In at least one embodiment, as shown in FIG. 4D, in response to a detected selection of a single design (e.g., the cup design 130b in the digital canvas 118c) followed by a detected selection of the shape matching tool 134, the digital media management system identifies a base design associated with the selected design and all other matching designs relative to the selected design. Additionally, after identifying all the designs that match the selected design, the digital media management system maps the matching designs and corresponding sub-shapes together within the digital canvas data structure associated with the currently active document. In one or more embodiments, this mapping enables the digital media management system to automatically apply edits made to any sub-shape within the identified base design to all other corresponding sub-shapes in matching designs within the digital canvas data structure.

Figure 4E:
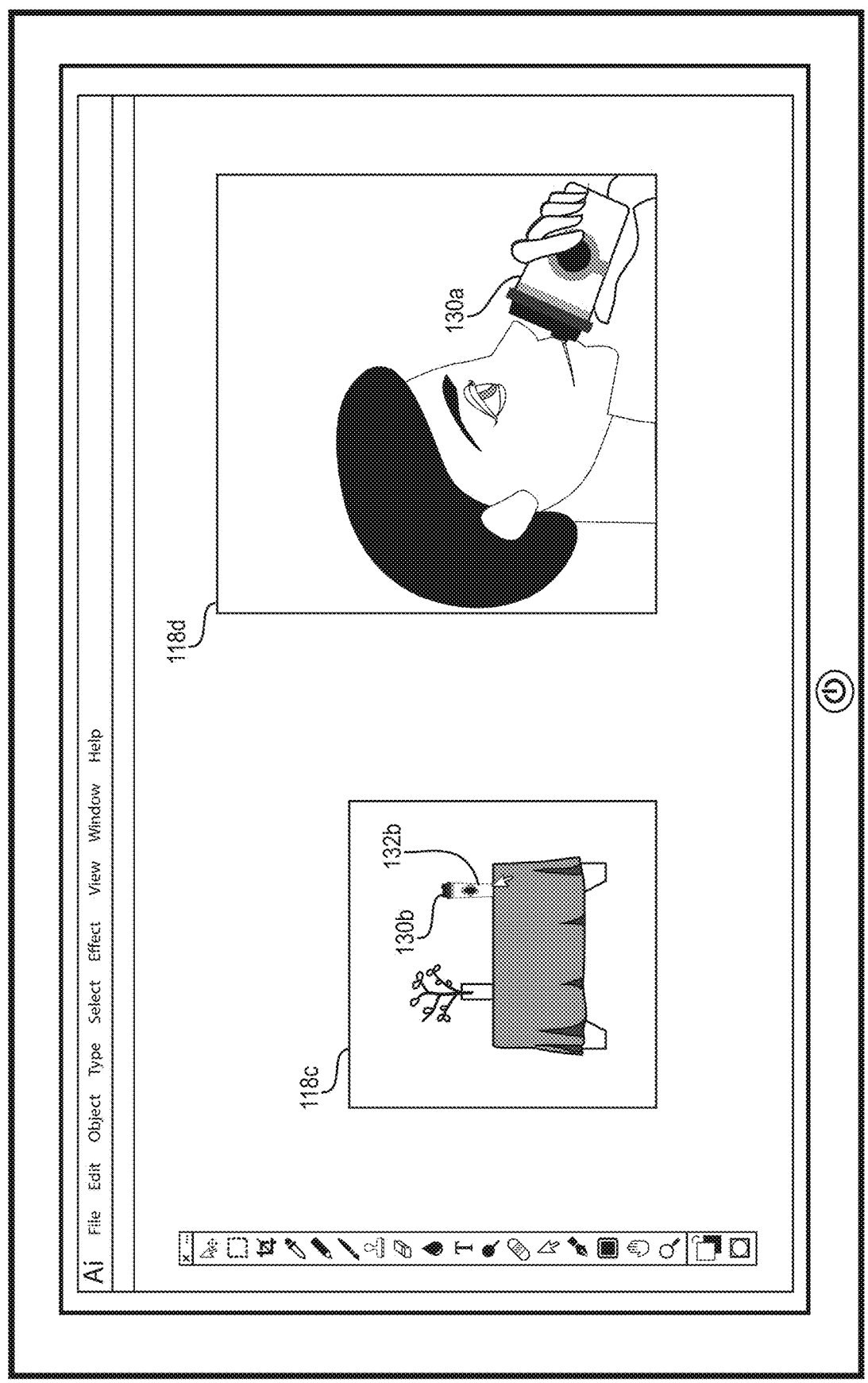

For example, as shown in FIG. 4D, in response to the detected selection of the cup design 130b in the digital canvas 118c followed by the detected selection of the shape matching tool 134, the digital media management system identifies the cup design 130a as the base design associated with the cup design 130b. Next, the digital media management system maps the cup design 130b (and its associated sub-shapes) to the cup design 130a within the associated digital canvas data structure. Then, in response to a detected edit to the sub-shape 132a within the cup design 130a in the digital canvas 118d (e.g., changing the color of the sub-shape representing the body of the cup to the color white), as shown in FIG. 4D, the digital media management system automatically applies the detected edit to the corresponding sub-shape 132b within the cup design 130b, as shown in FIG. 4E. As further shown in FIG. 4E, the digital media management system automatically applies this detected edit even though the cup design 130b is a different size and rotation than the cup design 130a.

FIGS. 4A-4E illustrate a simplified example for purposes of explanation. In other embodiments, the digital media management system can automatically match complex sub-shapes across designs in digital canvases in complex arrangements. For example, in a more complex embodiment, a design may include a person (e.g., a comic book-style superhero) depicted across multiple digital canvases in various attitudes of movement. In that example, the design of the person may include multiple sub-shapes for various body parts (e.g., arms, legs, torso, head, facial features), articles of clothing (e.g., pants, shirt, shoes), and held items. In a first digital canvas, the design of the person may include the person standing forward-facing and upright. In a second digital canvas, the design of the person may include the person in a crouch, which a third digital canvas may include the design of the person shown in a flying formation. Accordingly, in each digital canvas, the various sub-shapes associated with the design of the person may be in various states of warping and rotation.

In one or more embodiments, the digital media management system identifies and maps matching sub-shapes between each instance of the design of the person across the digital canvases, in the manner described above with reference to FIGS. 4A-4E, and further described below with reference to FIGS. 5A and 5B. For example, after mapping the matching sub-shapes, the digital media management system can automatically apply edits performed on one sub-shape to every other mapped sub-shape. To illustrate, a user may change the color of the shirt sub-shape in the first digital canvas. In response to this detected edit, the digital media management system can change the color of other shirt sub-shapes in the second and third digital canvas that are mapped to the shirt sub-shape in the first digital canvas. As such, the digital media management system prevents the user from having to spend time and resources in manually changing the color of the shirt sub-shape in each digital canvas.

Figure 5A:
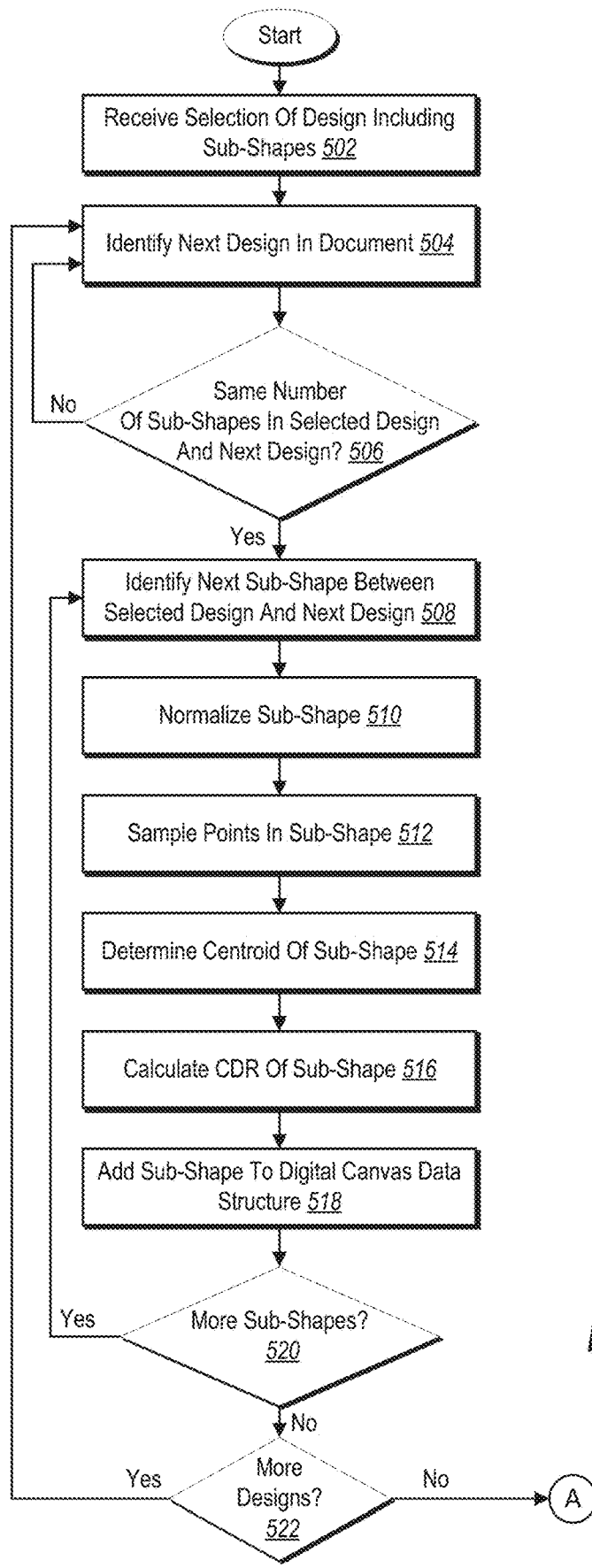
FIGS. 5A-5B illustrates a sequence diagram of a process of automatically applying detected edits across matching sub-shapes in accordance with one or more embodiments.

FIG. 5A illustrates an example sequence of acts involved in automatically applying edits across matching sub-shapes of designs, as described above with reference to FIGS. 4A-4E. For example, as shown in FIG. 5A, the sequence of acts can begin with the act 502 of receiving a selection of a design including one or more sub-shapes. In one or more embodiments, the digital media management system receives the selection of the design as a mouse-click or tap touch gesture over a design within a digital canvas. Alternatively, the digital media management system can automatically select a design among the one or more designs in a currently active document by identifying the design associated with the earliest creation timestamp.

After receiving a selection of a design, the digital media management system identifies potential matches for the selected design among the additional designs in the document. For example, in order to cut excess processing time from the automatic matching algorithm, the digital media management system attempts to match the selected design to other designs with the same number of sub-shapes. This prevents the digital media management system from wasting resources on attempting a match between two designs that are clearly different.

As shown in FIG. 5A, the sequence of acts includes the act 504 of identifying the next design in the document followed by the act 506 of determining whether the same number of sub-shapes exist in the selected design and the next design. For example, the digital media management system identifies the next design in the document in the act 504 by identifying a next closest design in the digital canvas containing the selected design. Alternatively, the digital media management system can identify the next design as the design with the next closest creation timestamp compared to the creation timestamp of the selected design.

After identifying the next design, the digital media management system determines whether the same number of sub-shapes exist between the selected design and the next design. For example, as discussed above, the digital media management system can determine a number of sub-shapes associated with a design based on metadata associated with the design, or by analyzing the design itself. If the selected design and the next design do not have the same number of sub-shapes (e.g., "No"), the sequence illustrated in FIG. 5A moves back to the act 504 and the digital media management system identifies another next design in the currently active document.

If the selected design and the next design have the same number of sub-shapes (e.g., "Yes"), the sequence illustrated in FIG. 5A next includes an act 508 of identifying a next sub-shape between the selected design and the next design. For example, in response to determining that the selected design and the next design have the same number of sub-shapes, the digital media management system adds each sub-shape in the next design to the digital canvas data structure. As discussed above with reference to FIG. 2, the digital media management system can add entire designs to the digital canvas data structure associated with the currently active document. In additional embodiments, such as discussed with reference to FIGS. 4A-5, the digital media management system can add individual sub-shapes associated with a design to the digital canvas data structure associated with the currently active document.

For example, the digital media management system adds a sub-shape of a design to the digital canvas data structure by first performing the act 510 of normalizing the sub-shape 510. As discussed above with reference to FIG. 2, the digital media management system normalizes a sub-shape by enlarging or reducing the size of the sub-shape until it fits within a standard R×R sized grid. In one or more embodiments, this normalization minimizes the calculation space associated with calculations including one or more sub-shapes.

Next, the digital media management system performs the act 512 of sampling points in the sub-shape. In one or more embodiments, the digital media management system samples points in the sub-shape by identifying any number of points at equal distances along the perimeter of the sub-shape. Alternatively, the digital media management system may sample points in the sub-shape by identifying a predetermined number of points at equal distances along the perimeter of the sub-shape.

After sampling points in the sub-shape, the digital media management system performs the act 514 of determining the centroid of the sub-shape, followed by the act 516 of calculating the centroid distance ratio (CDR) of the sub-shape. As discussed above with reference to FIG. 2, the digital media management system determines the centroid of the sub-shape by identifying coordinates associated with each sampled point in the sub-shape, and dividing each coordinate by the number of sampled points. Additionally, the digital media management system calculates the CDR of the sub-shape by first identifying the distance from each sampled point in the sub-shape to the centroid of the sub-shape. The digital media management system then sorts the distances in either ascending or descending order. Next, the digital media management system takes ratios of the first distance and the last distance, the second distance and the second to last distance, the third distance and the third to last distance, and so forth until all distances are accounted for or until a predetermined number of ratios (e.g., 20) are determined. In one or more embodiments, the resulting sequence of ratios is the CDR or feature vector of the sub-shape.

After calculating the CDR of the sub-shape, the digital media management system performs the act 518 of adding the sub-shape to the digital canvas data structure. For example, the digital media management system can add the sub-shape, along with the determined centroid, calculated CDR, and other metadata associated with the sub-shape to the digital canvas data structure. In one embodiment, the digital media management system adds the sub-shape to the digital canvas data structure as a leaf node associated with the design from which the sub-shape was identified. Alternatively, the digital media management system can add the sub-shape to a bucket or cluster of other sub-shapes with similar CDRs.

In the act 520, the digital media management system determines if there are additional sub-shapes in the next design that have not been added to the digital canvas data structure. If there are additional sub-shapes that have not been added to the digital canvas data structure (e.g., "Yes"), the digital media management system performs the acts 508-518 with the next sub-shape in the design. If there are no additional sub-shapes (e.g., "No"), the digital media management system performs the act 522 of determining whether there are additional designs in the document that have yet to be compared to the selected design. If there are additional designs, the digital media management system performs the acts 504-520 with the next additional design.

Figure 5B:
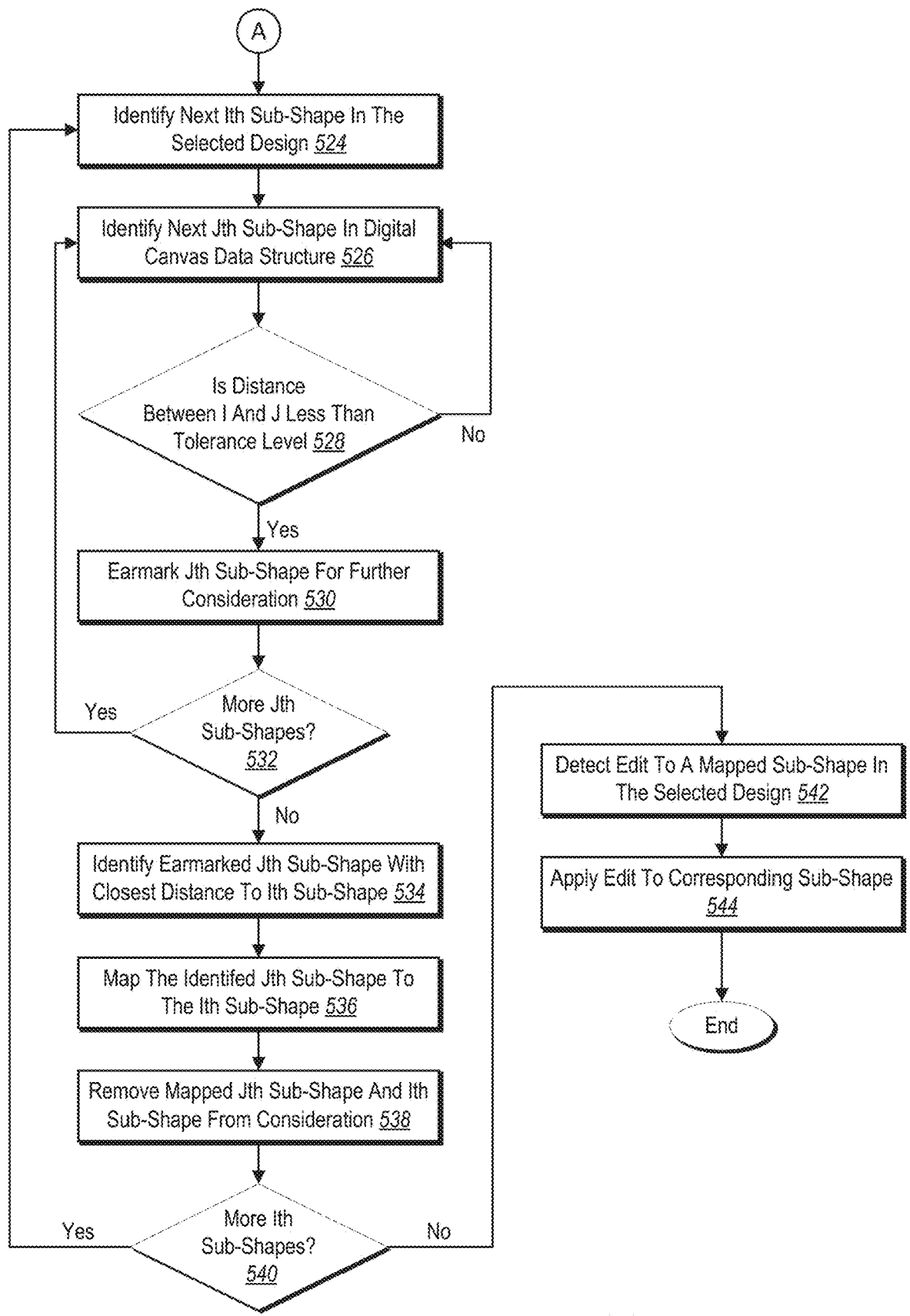

If there are no additional designs to compare to the selected design, the digital media management system maps sub-shapes in the digital canvas data structure to sub-shapes in the selected design (e.g., follow "A" to FIG. 5B). For example, as shown in FIG. 5B, the digital media management system first performs the act 524 of identifying the next i-th sub-shape in the selected design. As described above with reference to FIG. 2, if the digital media management system is in the first iteration of this mapping procedure, the digital media management system can identify the next i-th sub-shape as the sub-shape in the selected design with the earliest creation timestamp.

After identifying the next i-th sub-shape of the selected design, the digital media management system performs the act 526 of identifying the next j-th sub-shape in the digital canvas data structure. In some embodiments, the digital media management system can identify the next j-th sub-shape as the sub-shape in the digital canvas data structure with the next closest creation timestamp relative to the creation timestamp of the i-th sub-shape. Alternatively, the digital media management system can identify the next j-th sub-shape as the sub-shape in the digital canvas data structure nearest the i-th sub-shape base on the layout of the clusters and/or nodes within the digital canvas data structure.

With the i-th and j-th sub-shapes identified, the digital media management system performs the act 528 of determining whether the distance between the CDRs of the i-th and j-th sub-shapes is less than the predetermined tolerance level. For example, as described above with reference to FIGS. 2 and 3, the digital media management system determines the Euclidean distance between the CDRs of the i-th and j-th sub-shapes and compares the determined distance to a predetermined tolerance level (e.g., ~1.5). If the determined distance is not less than the tolerance level (e.g., "No"), the digital media management system continues searching for a j-th sub-shape that corresponds to the i-th sub-shape by identifying the next j-th sub-shape in the digital canvas data structure in the act 526.

If the determined distance is less than the tolerance level (e.g., "Yes"), the digital media management system performs the act 530 and earmarks the j-th sub-shape for further consideration. In one or more embodiments, it is possible that multiple sub-shapes in the digital canvas data structure roughly correspond to the i-th sub-shape in the selected design. Thus, in at least one embodiment, the act 528 of determining whether the distance between the i-th and j-th sub-shapes is less than the predetermined tolerance level search to identify a subset of j-th sub-shapes that have a high probability of matching the i-th sub-shape. Accordingly, the digital media management system can earmark the j-th sub-shape for further consideration (e.g., in the act 530) by adding the j-th sub-shape to a group of j-th sub-shapes, by adding the j-th sub-shape to a list or table of j-th sub-shapes, or by generating a pointer to the j-th sub-shape within the digital canvas data structure.

The digital media management system then performs the act 532 of determining whether there are additional j-th sub-shapes in the digital canvas data structure. If there are additional j-th sub-shapes (e.g., "Yes"), the digital media management system repeats the steps 526-532 with an additional j-th sub-shape. If there are no additional j-th sub-shapes (e.g., "No"), the digital media management system performs the act 534 of identifying an earmarked j-th sub-shape with the closest distance to the i-th sub-shape. For example, the digital media management system can perform the act 534 by identifying the j-th sub-shape with the shortest Euclidean distance from the i-th sub-shape. In one or more embodiments, the digital media management system determines that the j-th sub-shape with the shortest distance from the i-th sub-shape is most likely the corresponding sub-shape from another design within the digital canvas data structure. In one or more embodiments, if there are multiple earmarked j-th sub-shapes with identical shortest distances from the i-th sub-shape, the digital media management system can map each of the multiple earmarked j-th sub-shapes to the i-th sub-shape in the act 536. Alternatively, or additionally, rather than identifying the earmarked j-th sub-shape with the closest distance to the i-th sub-shape, the digital media management system can identify all earmarked j-th sub-shapes with a distance to the i-th sub-shape that is below a second predetermined threshold level (e.g., ~0.75).

After identifying at least one earmarked j-th sub-shape with a closest distance to the i-th sub-shape, the digital media management system performs the act 536 of mapping the identified j-th sub-shape to the i-th sub-shape. In one or more embodiments, the digital media management system maps the j-th sub-shape to the i-th sub-shape by adding a pointer or reference to the i-th sub-shape into the metadata associated with the j-th sub-shape within the digital canvas data structure. Additionally, or alternatively, the digital media management system can map the j-th sub-shape to the i-th sub-shape by changing the position or bucket in which the j-th sub-shape is stored within the digital canvas data structure such that the j-th sub-shape is directly associated with the i-th sub-shape within the digital canvas data structure (e.g., as a child-node of a node associated with the i-th sub-shape in the digital canvas data structure). Additionally, or alternatively, the digital media management system can map the j-th sub-shape to the i-th sub-shape by determining an x-scale and a y-scale for the j-th sub-shape and replace the data entry for the j-th sub-shape in the digital canvas data structure with a reference to the i-th sub-shape and the determined x-scale and y-scale of the j-th sub-shape.

In one or more embodiments, the digital media management system assumes a one-to-one mapping between sub-shapes in designs. For example, as shown in FIGS. 4A-4E, the digital media management system assumes that each instance of the cup design a circular label sub-shape in a cup design 130 includes one circular label sub-shape. Accordingly, once the digital media management system maps all corresponding instances of j-th sub-shape to the i-th sub-shape, the digital media management system performs the act 538 of removing the j-th sub-shape and the i-th sub-shape from further consideration. In one or more embodiments, by no longer including the j-th sub-shape and the i-th sub-shape in future iterations of the acts 526-538, the digital media management system utilizes less computing resources and speeds the process of mapping sub-shapes.

Next, the digital media management system continues to attempt mapping the other sub-shapes in the selected design by performing the act 540 of determining whether additional i-th sub-shapes exist in the selected design. If additional i-th sub-shapes exist, the digital media management system repeats the acts 524-538 with the next i-th sub-shape in the selected design. If no additional i-th sub-shapes exist, the digital media management system considers the selected design fully mapped within the digital canvas data structure.

At some point after the mapping is completed, the digital media management system performs the act 542 of detecting an edit to a mapped sub-shape within the selected design. For example, the digital media management system can detect an edit such as a color change, a line-width change, a size change, and so forth. In response to detecting this edit in the act 542, the digital media management system performs the act 544 of automatically applying the detected edit to every corresponding sub-shape in the digital canvas data structure.

As just described, the digital media management system can map designs across digital canvases by matching sub-shapes between designs. Accordingly, in addition to the other disclosure herein, the acts (e.g., the acts 502-544) and algorithms discussed in relation to FIGS. 5A-5B can comprise a corresponding structure for a step for mapping each of the one or more sub-shapes in a selected design to a corresponding sub-shape in a base design in the digital canvas data structure.

Figure 6:
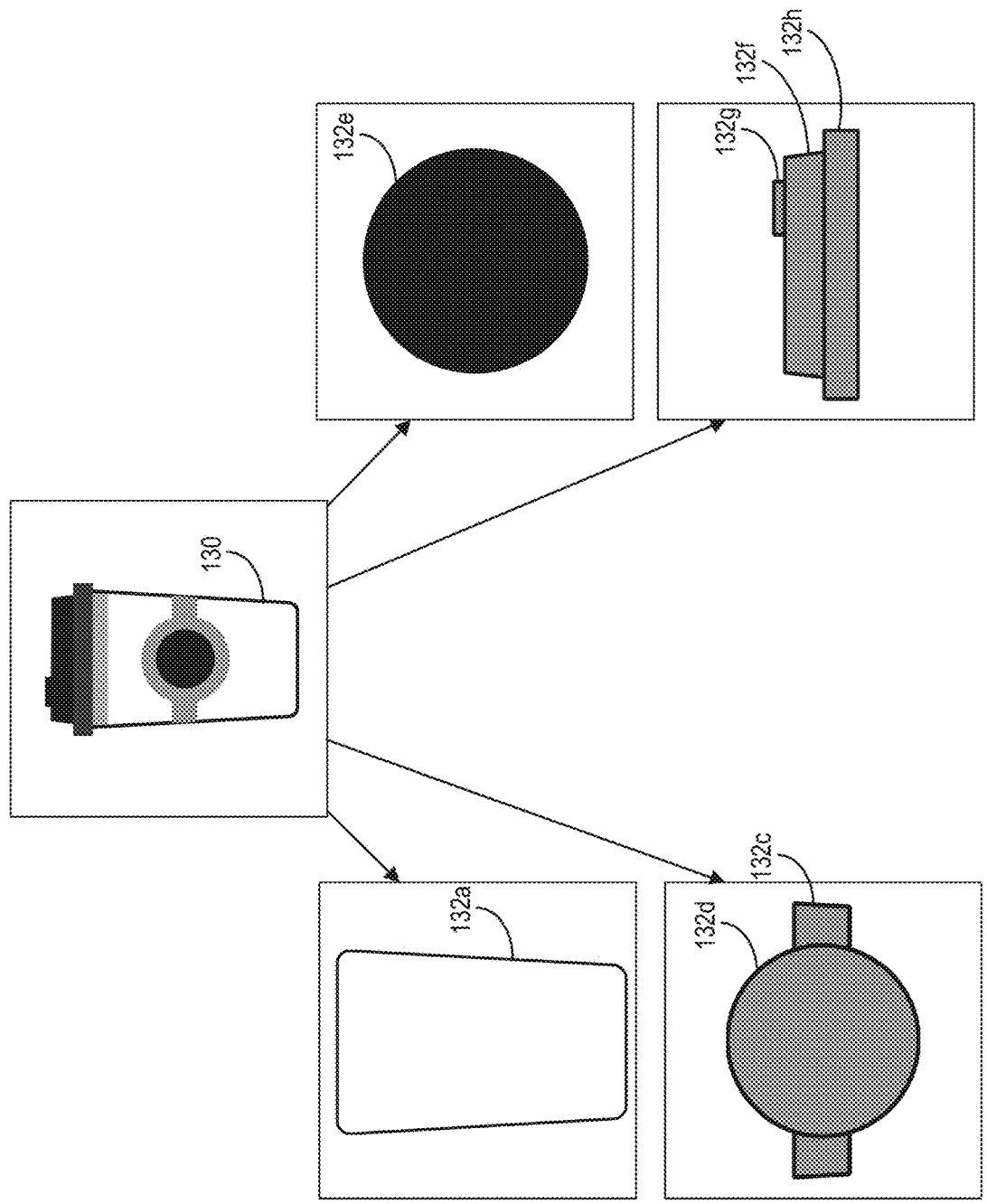
FIG. 6 illustrates an example of a design including various sub-shapes in accordance with one or more embodiments.

FIG. 6 illustrates a single design and the one or more sub-shapes that compose the design. As mentioned above, the digital media management system utilizes similar procedures and algorithms to match and map designs as well as sub-shapes of designs. For example, as shown in FIG. 6, the cup design 130 is made of multiple sub-shapes 132*a*, 132*c*, 132*d*, 132*e*, 132*f*, 132*g*, and 132*h*.

In one or more embodiments, the digital media management system can recognize adjacent sub-shapes. For instance, the sub-shapes 132*f*-132*h* are positioned next to each other to approximate the appearance of a cup lid. Additionally, the digital media management system recognizes layered sub-shapes. For example, the sub-shapes 132*c*-132*e* are layered over each other and over the sub-shape 132*a* to give the appearance of a cup label.

Figure 7A:
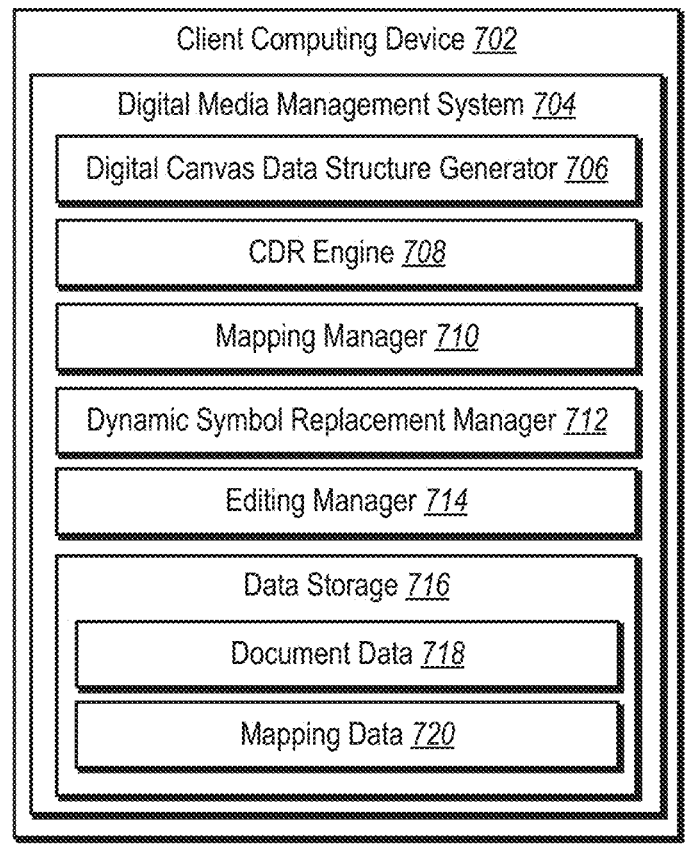
FIGS. 7A-7B illustrates an example architecture diagrams of the digital media management system in accordance with one or more embodiments.

FIG. 7A illustrates an example architecture for the digital media management system 704 operating on a client computing device 702. Although illustrated on the client computing device 702, the digital media management system 704 can be implemented by another computing device (e.g., a networked server such as a web host), and accessed via a native application or web browser installed on the client computing device 702. In one or more embodiments, the digital media management system 704 includes a digital canvas data structure generator 706, a CDR engine 708, a mapping manager 710, a dynamic symbol replacement manager 712, an editing manager 714, and a data storage 716 including digital canvas data 718 and mapping data 720.

Although the disclosure herein shows the components 706-716 to be separate in FIG. 7A, any of the components 706-716 may be combined into fewer components, such as inter a single facility or module, or divided into more components as may serve one or more embodiments. In addition, the components 706-716 may be located on, or implemented by, one or more computing devices, such as those described below in relation to FIG. 10.

In one or more embodiments, the components 706-716 comprise software, hardware, or both. For example, the components 706-716 can comprise computing instructions stored on a non-transitory computer-readable storage medium and executable by the client computing device 702. When executed by the at least one processor, the computer-executable instructions cause the client computing device 702 to perform the methods and processes described herein. Alternatively, the components 706-716 can comprise hardware, such as a special purpose processing device to perform a certain function or group of functions. Additionally, the components 706-716 can comprise a combination of computer-executable instructions and hardware.

As mentioned above, and as shown in FIG. 7A, the digital media management system 704 includes the digital canvas data structure generator 706. In one or more embodiments, the digital canvas data structure generator 706 builds a digital canvas data structure including designs and sub-shapes from a currently active documents. For example, as discussed above, a document can include one or more digital canvases, and each digital canvas can include one or more designs, each including one or more sub-shapes.

In at least one embodiment, the digital canvas data structure generator 706 builds the digital canvas data structure associated with a document by iterating through each digital canvas in the document. For example, the digital canvas data structure generator 706 can iterate through a digital canvas by iterating through each design in the digital canvas. It follows that the digital canvas data structure generator 706 iterates through a design by iterating through each sub-shape in the design. For each sub-shape, design, and digital canvas in the document, the digital canvas data structure generator 706 can perform an analysis that identifies metadata such as, but not limited to, a creation timestamp, positioning, path coordinates, and colors of the sub-shape, design, or digital canvas.

In one or more embodiments, the digital canvas data structure generator 706 can organize the analyzed digital canvases, designs, and sub-shapes, such that their relationships are reflected in the digital canvas data structure. For example, in at least one embodiment, the digital canvas data structure generator 706 can generator the digital canvas data structure in a tree-node format where digital canvases are stored as nodes of the document, designs are stored as nodes of their associated digital canvases, and sub-shapes are stored as nodes of their associated designs. Alternatively, the digital canvas data structure generator 706 can store digital canvases, designs, and sub-shapes in clusters, hash table buckets, table cells, and so forth in order to indicate a relationship between each tier of visual information.

In one or more embodiments, the digital canvas data structure generator 706 builds a digital canvas data structure in response to various triggers. For example, in one embodiment, the digital canvas data structure generator 706 builds a digital canvas data structure in response to a new document being opened (e.g., in response to a detected "File Open" command). In another embodiment, the digital canvas data structure generator 706 builds a digital canvas data structure in response to a detected selection of a particular tool (e.g., the dynamic symbol conversion tool 124 discussed above with reference to FIGS. 1A-1E) via a digital media management system application installed on the client computing device 702. In yet another embodiment, the digital canvas data structure generator 706 builds a digital canvas data structure in response to a detected selection of a design or sub-shape followed by a detected selection of a particular tool (e.g., the shape matching tool 134 discussed above with reference to FIGS. 4A-4E).

After generating a digital canvas data structure, the digital canvas data structure generator 706 can also update the digital canvas data structure. For example, in response to the determination of a CDR associated with a design within the digital canvas data structure, the digital canvas data structure generator 706 can move a node associated with the design to a position within the digital canvas data structure that corresponds to the determined CDR for that design. Furthermore, the digital canvas data structure generator 706 can generate a digital canvas data structure piecemeal depending on how the digital canvas data structure generator was triggered. For example, the digital canvas data structure generator 706 can generate a digital canvas data structure to the design level. Then later, in response to a detected selection of the shape matching tool 134, discussed above, the digital canvas data structure generator 706 can update the digital canvas data structure to include nodes at the sub-shape level.

As mentioned above, and as shown in FIG. 7A, the digital media management system 704 includes the CDR engine 708. In one or more embodiments, the CDR engine 708 performs the actions involved in calculating a centroid distance ratio for a design or a sub-shape. For example, as described above, the CDR engine 708 normalizes a particular design or sub-shape to a standard size. Next, the CDR engine 708 samples points around the perimeter of the design or sub-shape and determines the centroid of the design or sub-shape. Finally, the CDR engine 708 calculates the CDR of the design or sub-shape. In one or more embodiments, the CDR engine 708 provides the calculated CDR to the digital canvas data structure generator 706 to be stored as metadata associated with the design or sub-shape.

Furthermore, as shown in FIG. 7A, the digital media management system 704 includes the mapping manager 710. In one or more embodiments, the mapping manager 710 calculates a distance (e.g., a Euclidean distance or vector distance) between the CDRs of two designs or sub-shapes, and determines whether that distance is less than a predetermined tolerance level. If the calculated distance is less than the predetermined tolerance level, the mapping manager 710 maps the two designs or sub-shapes together within the associated digital canvas data structure.

In one or more embodiments, the mapping manager 710 maps two designs or sub-shapes together by first determining a base design or base sub-shape. For example, in at least one embodiment, the mapping manager 710 determines that one or two designs is a base design by identifying which of the two designs has an earlier creation timestamp. The mapping manager 710 can make a similar determination for sub-shapes. Alternatively, the mapping manager 710 can determine that a design or sub-shape is a base design or base sub-shape in response to a manual indication received from the user of the client computing device 702.

After determining the base design or base sub-shape, the mapping manager 710 maps the second design or sub-shape to the base design or base sub-shape in one of various ways. For example, the mapping manager 710 can map the second design to the base design by adding a pointer to the base design to the metadata associated with the second design in the digital canvas data structure. Additionally, or alternatively, the mapping manager 710 can map the second sub-shape to the base sub-shape by moving the node associated with the second sub-shape within the digital canvas data structure such that it is within the same cluster or tree sub-structure as the node associated with the base sub-shape.

As further shown in FIG. 7A, the digital media management system 704 includes the dynamic symbol replacement manager 712. In one or more embodiments, the dynamic symbol replacement manager 712 generates a dynamic symbol corresponding to a group or cluster of mapped designs. For example, the dynamic symbol replacement manager 712 can generate a dynamic symbol corresponding to a cluster of mapped designs by identifying the base design within the cluster (e.g., as described above), and "flattening" or removing any layers from the base design to generate a vector-based symbol.

Additionally, the dynamic symbol replacement manager 712 replaces the mapped designs within the digital canvas data structure with the generated dynamic symbol. For example, the dynamic symbol replacement manager 712 can replace a mapped design with the generated dynamic symbol by removing any display information associated with the mapped design from the digital canvas data structure and replacing the display information with the dynamic symbol. Alternatively, the dynamic symbol replacement manager 712 may retain the display information associated with the mapped design within the digital canvas data structure, but may also add a pointer to the dynamic symbol within the node associated with the mapped design.

Additionally, as shown in FIG. 7A, the digital media management system 704 includes the editing manager 714. In one or more embodiments, the editing manager 714 detects edits to a particular design or sub-shape and applies the detected edits to every other design or sub-shape mapped to the particular design or sub-shape within the digital canvas data structure. For example, in one or more embodiments, the editing manager 714 detects edits to a base design or base sub-shape in a document. In response to the detected edits, the editing manager 714 identifies all designs or sub-shapes mapped to the base design or sub-shape within the digital canvas data structure. The editing manager 714 then applies the detected edit to each identified design or sub-shape.

Also, as mentioned above, the digital media management system 704 includes the data storage 716. The data storage 716 stores and maintains digital canvas data 718 representative of document information including digital canvases, designs, and sub-shapes, such as described herein. The data storage 716 also stores and maintains mapping data 720 representative of mapping information including a generated digital canvas data structure, such as described herein.

Figure 7B:
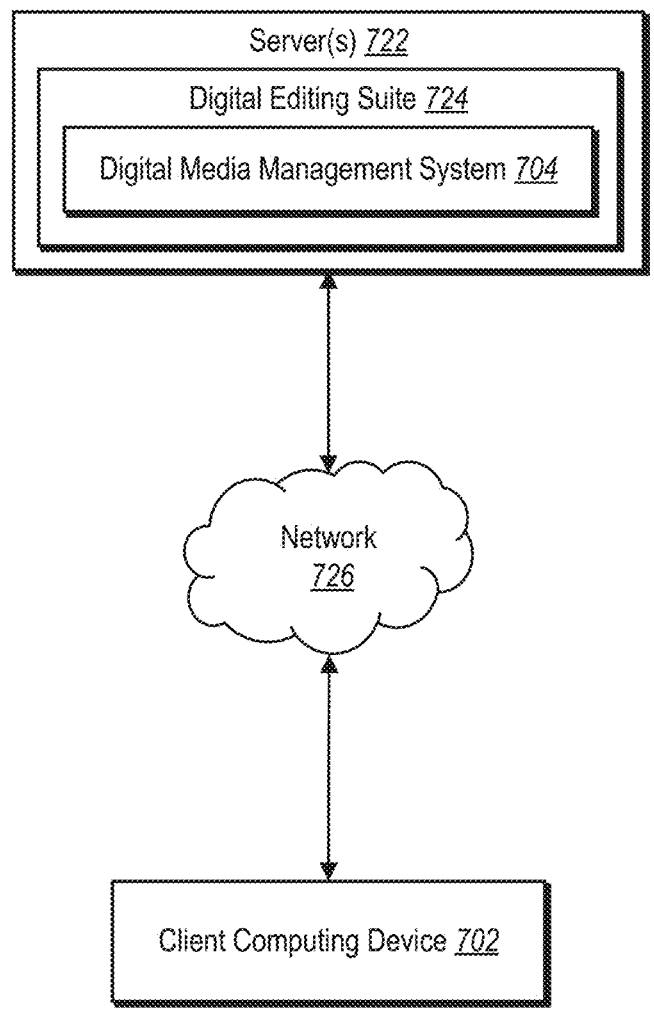

FIG. 7B illustrates an example environment in which the digital media management system 704 can operate. For example, as shown in FIG. 7A, in some embodiments, the digital media management system 704 can operate as a native installed application on the client computing device 702. Alternatively, the digital media management system 704 may be installed on the client computing device 702 as a web browser plugin, or another type of application plugin (e.g., a social media application plugin). In an alternative embodiment, as shown in FIG. 7B, the digital media management system 704 operates as part of a digital editing suite 724 on one or more server(s) 722 and is accessed by the client computing device 702 across a network 726.

For example, the client computing device 702 may include a computing device such as a desktop computer, a notebook or laptop computer, a netbook, a tablet computer, an e-book reader, a GPS device, a camera, a personal digital assistant (PDA), a handheld electronic device, a cellular telephone, a smartphone, other suitable electronic device, or any suitable combination thereof (as described in greater detail below in relation to FIG. 10). Additionally, in one or more embodiments, the server(s) 722 may include a variety of servers, sub-systems, programs, modules, logs, and data stores. In particular embodiments, the server(s), the server(s) 722 may include one or more of the following: a web server, action logger, API-request server, relevance-and-ranking engine, content-object classifier, notification controller, action log, third-party-content-object-exposure log, inference module, authorization or privacy server, search module, advertisement-targeting module, user-interface module, user-profile store, connection store, third-party content store, or location store. Additional detail regarding the server(s) 722 are provided below (e.g., in relation to FIG. 10).

As mentioned above, the client computing device 702 can access the digital media management system 704 on the server(s) 722 via the network 726. In one or more embodiments, the network 726 may include the Internet or World Wide Web. The network 726, however, can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks.

As shown in FIG. 7B, the digital media management system 704 can operate as part of the digital editing suite 724 on the server(s) 722. In one or more embodiments, the digital editing suite 724 includes tools, features, and other functionality that enable users to generate and edit robust digital images. For example, in one or more embodiments, the digital editing suite 724 may be implemented as one or more operating systems, as one or more stand-alone applications, as one or more modules of an application, as one or more plug-ins, as one or more library functions or functions that may be called by other applications, and/or as a cloud-computing model. Thus, the digital editing suite 724 may be implemented as a stand-alone application, such as a desktop or mobile application. Furthermore, the digital editing suite 724 may be implemented as one or more web-based applications hosted on a remote server (e.g., the server(s) 722). The digital editing suite 724 may also be implemented in a suite of mobile device applications or "apps." To illustrate, the digital editing suite 724 may be implemented in a software application, including but not limited to ADOBE® ACROBAT, ADOBE® CREATIVE CLOUD®, ADOBE® EXPERIENCE MANAGER, ADOBE® PHOTOSHOP®, ADOBE® ILLUSTRATOR, ADOBE® INDESIGN, ADOBE® STORY®, or ADOBE® LIGHTROOM®. "ADOBE," "CREATIVE CLOUD," "PHOTOSHOP," and "LIGHTROOM" are either registered trademarks or trademarks of Adobe Systems Incorporated in the United States and/or other countries.

Figure 8:
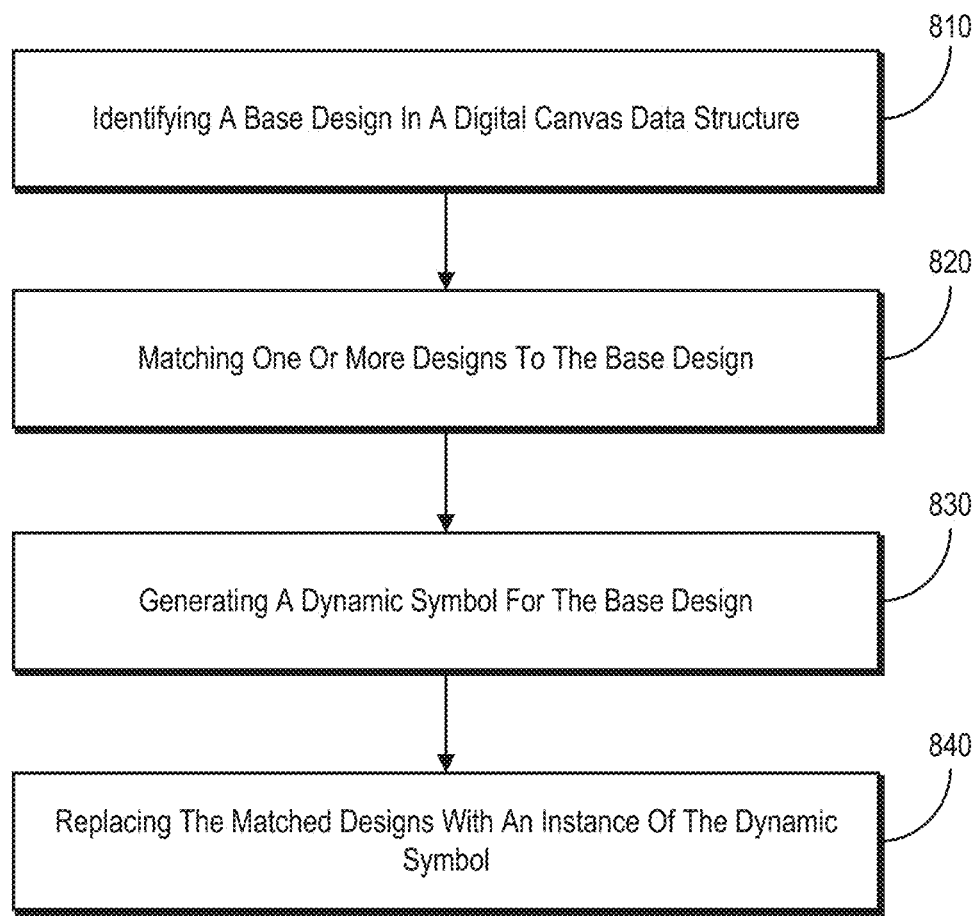
FIG. 8 illustrates a flowchart of a series of acts for replacing one or more matching designs in a document with a dynamic symbol in accordance with one or more embodiments.

Turning now to FIG. 8, this figure illustrates a flowchart of a series of acts 800 of replacing one or more matching designs in a document with a dynamic symbol in accordance with one or more embodiments described herein. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions, that when executed by one or more processors, cause a computing device to perform the acts of FIG. 8. In still further embodiments, a system can perform the acts of FIG. 8.

As shown in FIG. 8, the series of acts 800 includes an act 810 of identifying a base design in a document. For example, the act 810 can involve identifying at least one base design in the one or more designs within a digital canvas data structure associated with a document.

In at least one embodiment, the series of acts 800 includes an act of generating the digital canvas data structure associated with the document. For example, generating the digital canvas data structure associated with the document can involve analyzing one or more digital canvases in the document to identify one or more designs in each of the one or more digital canvases, determining metadata associated with each of the one or more designs in each of the one or more digital canvases, generating a storage node in the digital canvas data structure for each of the one or more designs and its associated metadata, and adding each generated storage node to the digital canvas data structure in a position within the digital canvas data structure that indicates the associated design's position within a digital canvas in the document.

In one or more embodiments, the act of generating the digital canvas data structure associated with the document can further involve, for each storage node added to the digital canvas data structure: normalizing the design associated with the storage node to a standard size; sampling a plurality of points in the normalized design; determining a centroid of the normalized design based on the sampled plurality of points; calculating a centroid distance ratio for the normalized design based on the determined centroid; and storing the centroid distance ratio calculated for the design within the storage node as metadata associated with the design.

Furthermore, as shown in FIG. 8, the series of acts 800 includes an act 820 of matching one or more designs to the base design. For example, the act 820 can involve matching a subset of the remaining one or more designs within the digital canvas data structure to the at least one base design.

In one or more embodiments, matching a subset of the remaining one or more designs within the digital canvas data structure to the at least one base design can include: identifying, within the digital canvas data structure, a centroid distance ratio associated with the base design; and for each of the subset of the remaining one or more designs: identifying, within the digital canvas data structure, a centroid distance ratio associated with the design; determining the distance between the centroid distance ratio associated with the base design and the centroid distance ratio associated with the design; and if the distance between the centroid distance ratio associated with the base design and the centroid distance ratio associated with the design is less than predetermined tolerance level, mapping the design to the base design within the digital canvas data structure.

Additionally, as shown in FIG. 8, the series of acts 800 includes an act 830 of generating a dynamic symbol for the base design. For example, the act 830 can involve generating a dynamic symbol corresponding to the at least one base design. In one or more embodiments, generating a dynamic symbol corresponding to the at least one base design includes identifying one or more paths within the base design; identifying one or more sub-shapes within the base design; and generating the dynamic symbol as a vector-based representation of the identified one or more paths and the identified one or more sub-shapes in a single layer.

Also, as shown in FIG. 8, the series of acts 800 includes an act 840 of replacing the matched designs with the dynamic symbol. For example, the act 840 can involve replacing, within the digital canvas data structure, each of the subset of the remaining one or more designs matched to the at least one base design with an instance of the dynamic symbol. In one or more embodiments, replacing, within the digital canvas data structure, each of the subset of the remaining one or more designs matched to the at least one base design with an instance of the dynamic symbol can include, for each of the subset of the remaining one or more designs matched to the at least one base design: identifying, within the generated digital canvas data structure, a storage node associated with the design; and replacing the identified storage node in the generated digital canvas data structure with a pointer to the dynamic symbol.

In one or more embodiments, the series of acts 800 further include an act of detecting an edit to the dynamic symbol. In at least one embodiment, the series of acts 800 further includes an act of automatically applying the detected edit to every instance of the dynamic symbol within the generated digital canvas data structure. For example, detecting the edit to the dynamic symbol can include detecting one or more of a color change to the symbol, a size change to the symbol, an opacity change to the symbol, a line-width change to the symbol, or a pattern change to the symbol.

Figure 9:
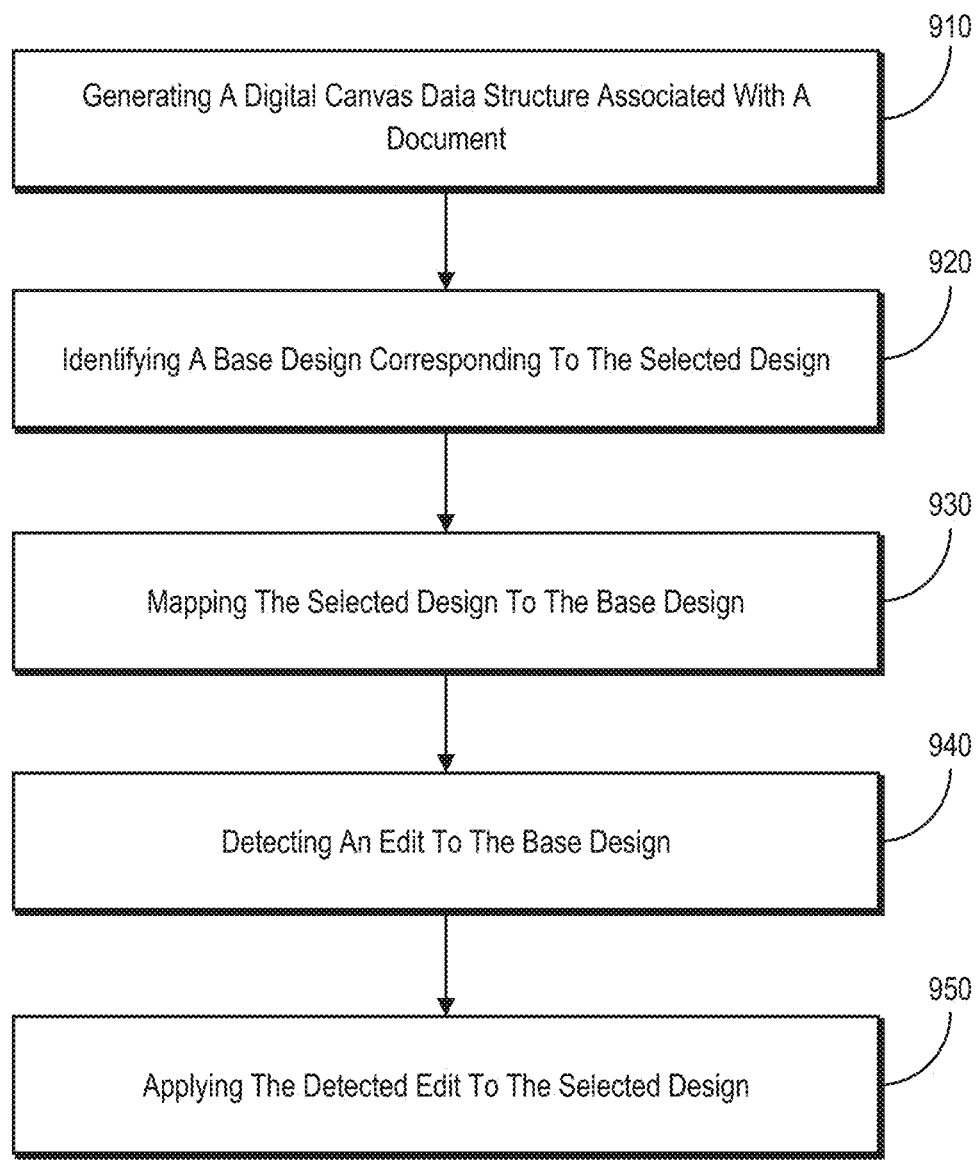
FIG. 9 illustrates a flowchart of a series of acts for automatically applying edits across matched sub-shapes in a document in accordance with one or more embodiments.

Turning now to FIG. 9, this figure illustrates a flowchart of a series of acts 900 of automatically applying edits across matched sub-shapes in a document in accordance with one or more embodiments described herein. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions, that when executed by one or more processors, cause a computing device to perform the acts of FIG. 9. In still further embodiments, a system can perform the acts of FIG. 9.

As shown in FIG. 9, the series of acts 900 includes an act 910 of generating a digital canvas data structure associated with a document. For example, the act 910 can involve generating a digital canvas data structure associated with a document, wherein the document comprises a plurality of designs, and each of the plurality of designs comprises one or more sub-shapes. In one or more embodiments, generating the digital canvas data structure includes: analyzing each of the plurality of designs to identify the one or more sub-shapes in each of the plurality of designs; determining metadata associated with each of the one or more designs and each of the one or more sub-shapes in each of the plurality of designs; generating a storage node in the digital canvas data structure for each of the plurality of designs and each of the one or more sub-shapes in each of the plurality of designs; and adding each generated storage node to the digital canvas data structure in a position within the digital canvas data structure that indicates the positional relationship between each of the plurality of designs and each of the one or more sub-shapes in each of the plurality of designs.

Additionally in at least one embodiment, generating the digital canvas data structure further includes, for each storage node added to the digital canvas data structure: normalizing the design or sub-shape associated with the storage node to a standard size; sampling a plurality of points around a perimeter of normalized design or sub-shape associated with the storage node; determining a centroid of each normalized design or sub-shape associated with the storage node based on the sampled plurality of points; calculating a centroid distance ratio for each normalized design or sub-shape associated with the storage node based on the determined centroid of each design or sub-shape; and storing centroid distance ratio calculated for the design or sub-shape within the associated storage node as metadata in the digital canvas data structure.

In one or more embodiments, calculating a centroid distance ratio for each normalized design or sub-shape associated with the storage node based on the determined centroid of each design or sub-shape includes, for each normalized design or sub-shape associated with the storage node: determining a distance from each of the plurality of sampled points around the perimeter of the normalized design or sub-shape to the centroid of the normalized design or sub-shape; sorting the determined distances from longest distance to shortest distance; and identifying ratios of pairs of determined distances to form a feature vector of the normalized design or sub-shape.

As shown in FIG. 9, the series of acts 900 includes an act 920 of identifying a base design corresponding to the selected design. For example, the act 920 can involve identifying a base design corresponding to the selected design within a display of the document. In one or more embodiments, identifying a base design corresponding to the selected design within a display of the document includes: determining, within the digital canvas data structure associated with the document, a number of sub-shapes corresponding to the selected design; identifying, within the digital canvas data structure, at least one additional design comprising the same number of sub-shapes as the selected design; determining, based on metadata associated with the identified at least one additional design and metadata associated with the selected design within the digital canvas data structure, that the at least one additional design is associated with an earlier creation timestamp than a creation timestamp associated with the selected design; and identifying the at least one additional design as the base design based on the determination.

As shown in FIG. 9, the series of acts 900 includes an act 930 of mapping the selected design to the base design. For example, the act 930 can involve mapping the selected design to the base design within the digital canvas data structure. In one or more embodiments, mapping the selected design to the base design within the digital canvas data structure includes, for each sub-shape associated with the selected design in the digital canvas data structure: determining a x-scale for the sub-shape associated with the selected design and a y-scale for the sub-shape associated with the selected design; identifying a sub-shape associated with the base design that corresponds to the sub-shape associated with the selected design in the digital canvas data structure; and replacing the sub-shape associated with the selected design in the digital canvas data structure with a reference to the corresponding sub-shape in the base design and the determined x-scale and y-scale.

As shown in FIG. 9, the series of acts 900 includes an act 940 of detecting an edit to the base design. For example, the act 940 can involve detecting an edit to one of the one or more sub-shapes in the base design. In one or more embodiments, detecting an edit to one of the one or more sub-shapes in the base design includes detecting one or more of a color change to the one or more sub-shapes, a size change to the one or more sub-shapes, an opacity change to the one or more sub-shapes, a line-width change to the one or more sub-shapes, or a pattern change to the one or more sub-shapes.

As shown in FIG. 9, the series of acts 900 includes an act 950 of applying the detected edit to the selected design. For example, the act 950 can involve in response to the detected edit to one of the one or more sub-shapes in the base design, automatically applying the detected edit to a corresponding sub-shape in the selected design based on the mapping within the digital canvas data structure. In one or more embodiments, the selected design is a warped copy of the base design.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
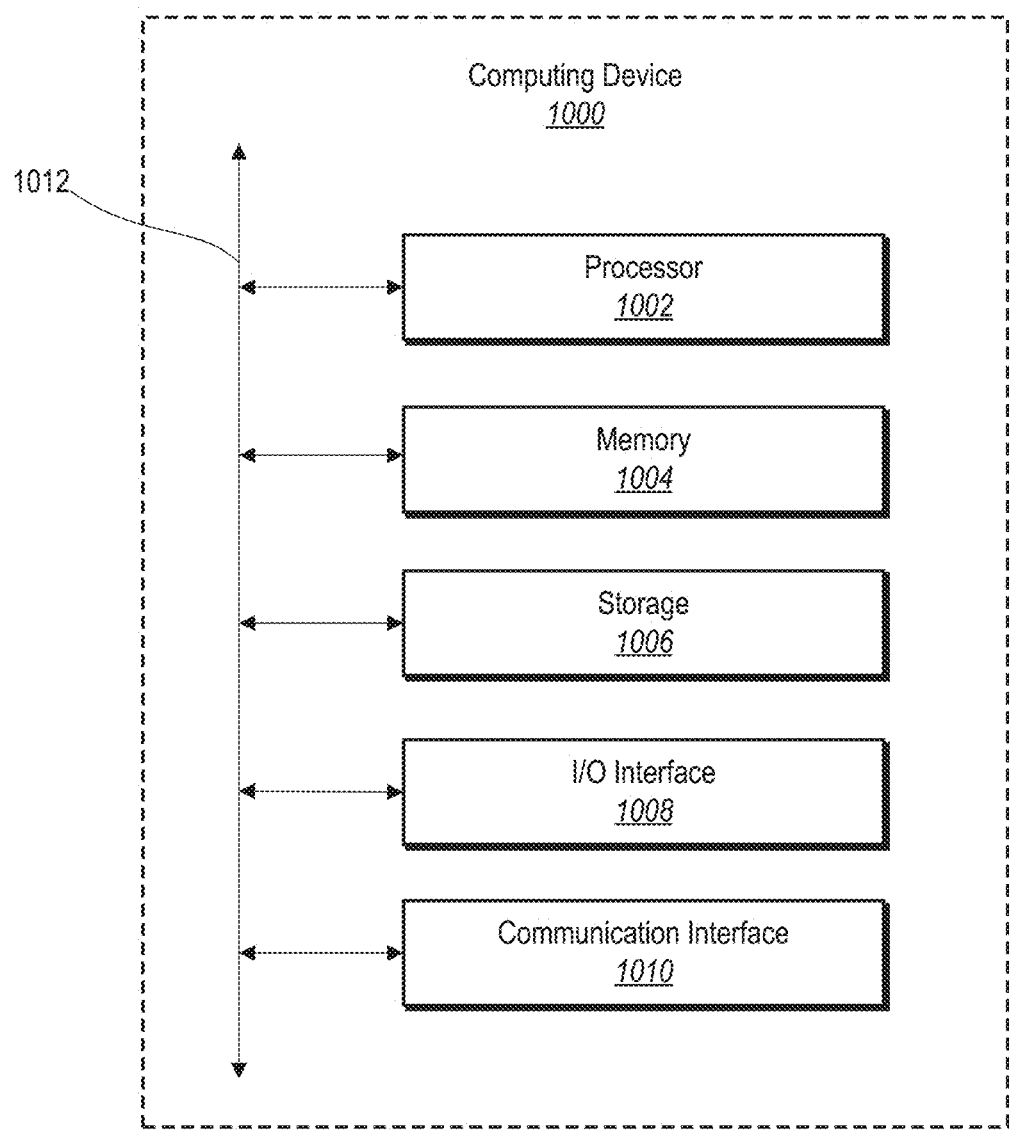
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the digital media management system 704 can be implanted on implementations of the computing device 1000. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory. In one or more embodiments, the memory 1004 stores or comprises the data storage.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices. In one or more embodiments, the storage device 1006 stores or comprise the data storage.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps or acts or the steps or acts may be performed in differing orders. Additionally, the steps or acts described herein may be repeated or performed in parallel with one another or in parallel with different instances of the same or similar steps or acts. The scope of the present application is, therefore, indicated by the appended claims rather than by the foregoing description. All changes that come within the meaning and range of equivalency of the claims are to be embraced within their scope.

We claim:

1. A non-transitory computer-readable storage medium storing instructions thereon that, when executed by at least one processor, cause a computer system to:
   identify at least one base design in one or more designs within a digital canvas data structure associated with a document;

match a subset of remaining one or more designs within the digital canvas data structure to the at least one base design;

generate a dynamic symbol corresponding to the at least one base design;

replace, within the digital canvas data structure, each of the subset of the remaining one or more designs matched to the at least one base design with an instance of the dynamic symbol;

detect an edit to the dynamic symbol; and automatically apply the detected edit to every instance of the dynamic symbol within the digital canvas data structure.

2. The non-transitory computer-readable storage medium as recited in claim 1, further storing instructions thereon that, when executed by the at least one processor, cause the computer system to generate the digital canvas data structure associated with the document by:

analyzing one or more digital canvases in the document to identify one or more designs in each of the one or more digital canvases;

determining metadata associated with each of the one or more designs in each of the one or more digital canvases;

generating a storage node in the digital canvas data structure for each of the one or more designs and its associated metadata; and adding each generated storage node to the digital canvas data structure in a position within the digital canvas data structure that indicates the associated design's position within a digital canvas in the document.

3. The non-transitory computer-readable storage medium as recited in claim 2, wherein the instructions that cause the computer system to generate the digital canvas data structure associated with the document further cause the computer system to:

for each storage node added to the digital canvas data structure:
normalize the design associated with the storage node to a standard size;
sample a plurality of points in the normalized design;
determine a centroid of the normalized design based on the sampled plurality of points;
calculate a centroid distance ratio for the normalized design based on the determined centroid; and
store the centroid distance ratio calculated for the design within the storage node as metadata associated with the design.

4. The non-transitory computer-readable storage medium as recited in claim 2, wherein the instructions that cause the computer system to match the subset of the remaining one or more designs within the digital canvas data structure to the at least one base design further cause the computer system to:

identify, within the digital canvas data structure, a centroid distance ratio associated with the base design; and
for each of the subset of the remaining one or more designs:
identify, within the digital canvas data structure, a centroid distance ratio associated with the design,
determine the distance between the centroid distance ratio associated with the base design and the centroid distance ratio associated with the design, and
if the distance between the centroid distance ratio associated with the base design and the centroid distance ratio associated with the design is less than predetermined tolerance level, map the design to the base design within the digital canvas data structure.

5. The non-transitory computer-readable storage medium as recited in claim 1, wherein the instructions that cause the computer system to generate the dynamic symbol corresponding to the at least one base design further cause the computer system to:

identify one or more paths within the base design;
identify one or more sub-shapes within the base design; and
generate the dynamic symbol as a vector-based representation of the identified one or more paths and the identified one or more sub-shapes in a single layer.

6. The non-transitory computer-readable storage medium as recited in claim 1, wherein the instructions that cause the computer system to replace, in the digital canvas data structure, each of the subset of the remaining one or more designs matched to the at least one base design with an instance of the dynamic symbol further cause the computer system to:

for each of the subset of the remaining one or more designs matched to the at least one base design:
identify, within the generated digital canvas data structure, a storage node associated with the design; and
replace the identified storage node in the digital canvas data structure with a pointer to the dynamic symbol.

7. The non-transitory computer-readable storage medium as recited in claim 1, wherein the instructions that cause the computer system to detect the edit to the dynamic symbol further cause the computer system to detect one or more of a color change to the symbol, a size change to the symbol, an opacity change to the symbol, a line-width change to the symbol, or a pattern change to the symbol.

8. A system comprising:
at least one processor; and
at least one non-transitory computer-readable storage medium storing instructions thereon that, when executed by the at least one processor, cause the system to:
generate a digital canvas data structure associated with a document, wherein the document comprises a plurality of designs, and each of the plurality of designs comprises one or more sub-shapes;
identify a base design corresponding to a selected design within a display of the document;
map the selected design to the base design within the digital canvas data structure;
detect an edit to one of the one or more sub-shapes in the base design; and
in response to the detected edit to one of the one or more sub-shapes in the base design, automatically apply the detected edit to a corresponding sub-shape in the selected design based on the mapping within the digital canvas data structure.

9. The system as recited in claim 8, wherein the instructions that, when executed by the at least one processor, cause the system to generate the digital canvas data structure further cause the system to:

analyze each of the plurality of designs to identify the one or more sub-shapes in each of the plurality of designs;
determine metadata associated with each of one or more designs and each of the one or more sub-shapes in each of the plurality of designs;
generate a storage node in the digital canvas data structure for each of the plurality of designs and each of the one or more sub-shapes in each of the plurality of designs; and add each generated storage node to the digital canvas data structure in a position within the digital canvas data structure that indicates a positional relationship between each of the plurality of designs and each of the one or more sub-shapes in each of the plurality of designs.

10. The system as recited in claim 9, wherein the instructions that, when executed by the at least one processor, cause the system to generate the digital canvas data structure further cause the system to:
for each storage node added to the digital canvas data structure:
normalize the design or sub-shape associated with the storage node to a standard size;
sample a plurality of points around a perimeter of normalized design or sub-shape associated with the storage node;
determine a centroid of each normalized design or sub-shape associated with the storage node based on the sampled plurality of points;
calculate a centroid distance ratio for each normalized design or sub-shape associated with the storage node based on the determined centroid of each design or sub-shape; and
store centroid distance ratio calculated for the design or sub-shape within the associated storage node as metadata in the digital canvas data structure.

11. The system as recited in claim 10, wherein calculating a centroid distance ratio for each normalized design or sub-shape associated with the storage node based on the determined centroid of each design or sub-shape comprises:
for each normalized design or sub-shape associated with the storage node:
determining a distance from each of the plurality of sampled points around the perimeter of the normalized design or sub-shape to the centroid of the normalized design or sub-shape;
sorting the determined distances from longest distance to shortest distance; and
identifying ratios of pairs of determined distances to form a feature vector of the normalized design or sub-shape.

12. The system as recited in claim 11, wherein the instructions that, when executed by the at least one processor, cause the system to identify the base design corresponding to the selected design within the display of the document further cause the system to:
determine, within the digital canvas data structure associated with the document, a number of sub-shapes corresponding to the selected design;
identify, within the digital canvas data structure, at least one additional design comprising the same number of sub-shapes as the selected design;
determine, based on metadata associated with the identified at least one additional design and metadata associated with the selected design within the digital canvas data structure, that the at least one additional design is associated with an earlier creation timestamp than a creation timestamp associated with the selected design; and
identify the at least one additional design as the base design based on the determination.

13. The system as recited in claim 12, wherein the instructions that, when executed by the at least one processor, cause the system to map the selected design to the base design comprises:
for each sub-shape associated with the selected design in the digital canvas data structure:
determine a x-scale for the sub-shape associated with the selected design and a y-scale for the sub-shape associated with the selected design;
identify a sub-shape associated with the base design that corresponds to the sub-shape associated with the selected design in the digital canvas data structure; and
replace the sub-shape associated with the selected design in the digital canvas data structure with a reference to the corresponding sub-shape in the base design and the determined x-scale and y-scale.

14. The system as recited in claim 13, wherein the instructions that, when executed by the at least one processor, cause the system to detect an edit to one of the one or more sub-shapes in the base design further cause the system to detect one or more of a color change to the one or more sub-shapes, a size change to the one or more sub-shapes, an opacity change to the one or more sub-shapes, a line-width change to the one or more sub-shapes, or a pattern change to the one or more sub-shapes.

15. The system as recited in claim 14, wherein the selected design is a warped copy of the base design.

16. In a digital medium environment for creating and editing documents, a method for automatically replacing designs in a document with a generated dynamic symbol comprising:
identifying at least one base design in one or more design within a digital canvas data structure associated with a document;
a step for matching a subset of remaining one or more designs within the digital canvas data structure to the at least one base design;
generating a dynamic symbol corresponding to the at least one base design;
replacing, within the digital canvas data structure, each of the subset of the remaining one or more designs matched to the at least one base design with an instance of the dynamic symbol;
detecting an edit to the dynamic symbol; and
automatically applying the detected edit to every instance of the dynamic symbol within the digital canvas data structure.

17. The method as recited in claim 16, further comprising generating the digital canvas data structure by:
analyzing one or more digital canvases in the document to identify one or more designs in each of the one or more digital canvases;
determining metadata associated with each of the one or more designs in each of the one or more digital canvases;
generating a storage node in the digital canvas data structure for each of the one or more designs and its associated metadata; and
adding each generated storage node to the digital canvas data structure in a position within the digital canvas data structure that indicates the associated design's position within a digital canvas in the document.

18. The method as recited in claim 17, wherein generating the dynamic symbol corresponding to the at least one base design comprises:
identifying one or more paths within the base design;
identifying one or more sub-shapes within the base design; and
generating the dynamic symbol as a vector-based representation of the identified one or more paths and the identified one or more sub-shapes in a single layer.

19. The method as recited in claim 18, wherein replacing, within the digital canvas data structure, each of the subset of the remaining one or more designs matched to the at least one base design with an instance of the dynamic symbol comprises:
- for each of the subset of the remaining one or more designs matched to the at least one base design:
- identifying, within the generated digital canvas data structure, a storage node associated with the design; and
- replacing the identified storage node in the generated digital canvas data structure with a pointer to the dynamic symbol.

20. The method as recited in claim 19, wherein detecting the edit to the dynamic symbol comprises detecting one or more of a color change to the symbol, a size change to the symbol, an opacity change to the symbol, a line-width change to the symbol, or a pattern change to the symbol.

* * * * *